US007016932B2

(12) United States Patent
Kantabutra et al.

(10) Patent No.: US 7,016,932 B2
(45) Date of Patent: Mar. 21, 2006

(54) ADDERS AND ADDER BIT BLOCKS HAVING AN INTERNAL PROPAGATION CHARACTERISTIC INDEPENDENT OF A CARRY INPUT TO THE BIT BLOCK AND METHODS FOR USING THE SAME

(75) Inventors: Vitit Kantabutra, Pocatello, ID (US); Pasquale Corsonello, Cosenza (IT); Stephania Perri, Cosenza (IT)

(73) Assignees: Idaho State University, Pocatello, ID (US); Departmente of Informatics and Transportation (DIMET), (IT); University of Reggio Calabria Loc., (IT)

( * ) Notice: Subject to any disclaimer, the term of this patent is extended or adjusted under 35 U.S.C. 154(b) by 666 days.

(21) Appl. No.: 10/029,836

(22) Filed: Oct. 23, 2001

(65) Prior Publication Data

US 2002/0091744 A1 Jul. 11, 2002

Related U.S. Application Data

(60) Provisional application No. 60/243,623, filed on Oct. 26, 2000.

(51) Int. Cl.
*G06F 7/50* (2006.01)

(52) U.S. Cl. ...................................................... 708/712

(58) Field of Classification Search ......... 708/710–712
See application file for complete search history.

(56) References Cited

U.S. PATENT DOCUMENTS 4,163,211 A * 7/1979 Miura ..................... 340/146.2
4,764,886 A * 8/1988 Yano .......................... 708/712
4,949,297 A * 8/1990 Matsuoka ................... 708/711
5,508,952 A 4/1996 Kantabutra

OTHER PUBLICATIONS

Koren, I.: "Computer Arithmetic Algorithms." Prentice-Hall, 1993; pp. 73-92.

Kantabutra, V.: "Designing Optimum One-Level Carry-Skip Adders," IEEE Trans. on Comp., 1993, vol. 42, n.6, pp. 759-764.

Chan, P.K., Schlag, M.D.F., Thomborson, C.D. Oklobdzija, V.G.: "Delay Optimization of Carry-Skip Adders and Block Carry-Look-Ahead Adders." Proc. of Int'l Symposium on Computer Arithmetic, 1991, pp. 154-164.

Nagendra, C., Irwin, M.J., Owens, R.M.: "Area-Time-Power Tradeoffs in Parallel Adders," IEEE Trans. CAS-II, 43, (10), pp. 689-702.

(Continued)

*Primary Examiner*—Tan V. Mai
(74) *Attorney, Agent, or Firm*—Myers Bigel Sibley & Sajovec

(57) ABSTRACT

Bit blocks for an adder are provided which include a first bit stage that generates a first bit associated propagation characteristic (bapc). The bapc is independent of a carry input to the bit block from another bit block of the adder. Additional bit stages may be included in the bit block such as a second bit stage that, based on the first bapc, generates a second bapc that is also independent of the carry input to the bit block. The first and second bapc may be generated based on first and second operand bits input to the respective stages and a bapc that is generated by a less significant bit stage of the bit block and is independent of the carry input to the bit block. Adders including the bit blocks and methods for adding using the bit block as well as bit block size optimization methods are also provided.

48 Claims, 21 Drawing Sheets

OTHER PUBLICATIONS

T. Lynch, E.E. Swartzlander, "A spanning-tree carry-look-ahead adder," IEEE Trans. on Comp., vol. 41, n.8, Aug. 1992.

Kantabutra, "A Recursive Carry-Look-Ahead/Carry-Select Hybrid Adder," IEEE Trans. on Comp., vol. 42, n.12, Dec. 1993.

R. Zimmermann and H. Kaeslin, Cell-Based Multilevel Carry-Increment Adders with Minimal AT-and PT-Products, unpublished manuscript at http://www.iis_ee_ethz_ch/~zimmi/.

A. Tyagi, "A Reduced-Area Scheme for Carry-Select Adders," IEEE Trans. on Comp., vol. 42, n.10, Oct. 1993.

P. Corsonello, S. Perri, and V. Kantabutra, "Design of 3:1 multiplexer standard cell", Electronics Letters, Nov. 23, 2000, vol. 36, No. 24, pp. 1994-1995.

* cited by examiner

ADDERS AND ADDER BIT BLOCKS HAVING AN INTERNAL PROPAGATION CHARACTERISTIC INDEPENDENT OF A CARRY INPUT TO THE BIT BLOCK AND METHODS FOR USING THE SAME

RELATED APPLICATIONS

The present application claims priority from U.S. Provisional Application Ser. No. 60/243,623 entitled "Fast, Low-Cost Adders Using Carry Strength Signals" filed Oct. 26, 2000, the disclosure of which is incorporated herein by reference as if set forth fully herein.

FIELD OF THE INVENTION

The present invention relates generally to adders and, more particularly, to adders including a plurality of bit blocks and methods for using the same.

BACKGROUND OF THE INVENTION

The importance of a fast, low-cost adder in a digital system is difficult to overestimate. Not only are adders used in every arithmetic operation, they are also needed for computing the physical address in virtually every memory fetch operation in most modern CPUs. Adders are also used in many other digital systems including telecommunications systems in places where a full-fledged CPU would be superfluous. Many styles of adders exist. Ripple adders are the smallest but also the slowest. More recently, carry-skip adders, as described in Koren, I.: "Computer Arithmetic Algorithms," Prentice-Hall, 1993; Kantabutra, V.: "Designing Optimum One-Level Carry-Skip Adders," IEEE Trans. on Comp., 1993, Vol. 42, n.6, pp. 759–764; and Chan, P. K., Schlag, M. D. F., Thomborson, C. D. Oklobdzija, V. G.: "Delay Optimization of Carry-Skip Adders and Block Carry-Look-Ahead Adders," Proc. of Int'l Symposium on Computer Arithmetic, 1991, pp. 154–164, are gaining popularity due to their high speed and relatively small size. Normally, in an N-bit carry-skip adder divided into a proper number of M-bit blocks, as described in Koren, I.: "Computer Arithmetic Algorithms," Prentice-Hall, 1993; Nagendra, C., Irwin, M. J., Owens, R. M.: "Area-Time-Power Tradeoffs in Parallel Adders," IEEE Trans. CAS-II, 43, (10), pp. 689–702, a long-range carry signal starts at a generic block $B_i$, rippling through some bits in that block, then skips some blocks, and ends in a block $B_j$. If the carry does not end at the LSB of $B_j$, then rippling occurs in that block and an additional delay is needed to compute the valid sum bits. Carry-look-ahead and carry-select adders as described in Koren, I.: "Computer Arithmetic Algorithms," Prentice-Hall, 1993 are fast but larger and consume much more power than ripple or carry-skip adders.

Two of the fastest known addition circuits are the Lynch-Swartzlander type as described in T. Lynch, E. E. Swartzlander, "A spanning-tree carry-look-ahead adder," IEEE Trans. on Comp., Vol. 41, n.8, August 1992 and the Kantabutra type as described in Kantabutra, "A Recursive Carry-Look-Ahead/Carry-Select Hybrid Adder," IEEE Trans. on Comp., Vol. 42, n.12, December 1993. These hybrid carry-look-ahead type adders are also described in U.S. Pat. No. 5,508,952, filed Oct. 19, 1993 which is entitled "Carry-LookAhead/Carry-Select Binary Adder," which is incorporated herein by reference in its entirety. They are based on the usage of a carry tree that produces carries into appropriate bit positions without back propagation. In order to obtain the valid sum bits as soon as possible, in both Lynch-Swartzlander type and Kantabutra type adders the sum bits are computed by means of carry-select blocks, which are able to perform their operations in parallel with the carry-tree.

A further known adder design is called the Carry-Increment Adder (CIA) as described in R. Zimmermann and H. Kaeslin, "Cell-Based Multilevel Carry-Increment Adders with Minimal AT-and PT-Products, unpublished manuscript at http://www.iis.ee.ethz.ch/~zimmi/extending the work in A. Tyagi, "A Reduced-Area Scheme for Carry-Select Adders," IEEE Trans. on Comp., Vol. 42, n.10, October 1993. These articles discuss reducing the redundancy in carry-select adders, and propose adders that are described as minimally slower than regular carry-select adders, requiring significantly less space.

SUMMARY OF THE INVENTION

Embodiments of the present invention provide bit blocks for an adder. The bit block includes a first bit stage that generates a first bit associated propagation characteristic (bapc). The bapc is independent of a carry input to the bit block from another bit block of the adder. Additional bit stages may be included in the bit block such as a second bit stage that, based on the first bapc, generates a second bapc that is also independent of the carry input to the bit block. The first and second bapc may be generated based on first and second operand bits input to the respective stages and a bapc that is generated by a less significant bit stage of the bit block and is independent of the carry input to the bit block.

The bit stages may also each generate a sum bit based on their input first and second operand bits and a respective bit stage carry input from a less significant bit stage of the bit block. More particularly, with reference, for example to the first and second bit stage, the second bit carry input to the second bit stage may be generated by the first bit stage with the first bit stage selecting either the carry input to the bit block or a calculated carry output as the second bit carry input based on the bapc input to the first bit stage.

Adders including the bit blocks and methods for adding using the bit block as well as bit block size optimization methods are also provided.

DETAILED DESCRIPTION OF THE INVENTION

Figure 1:
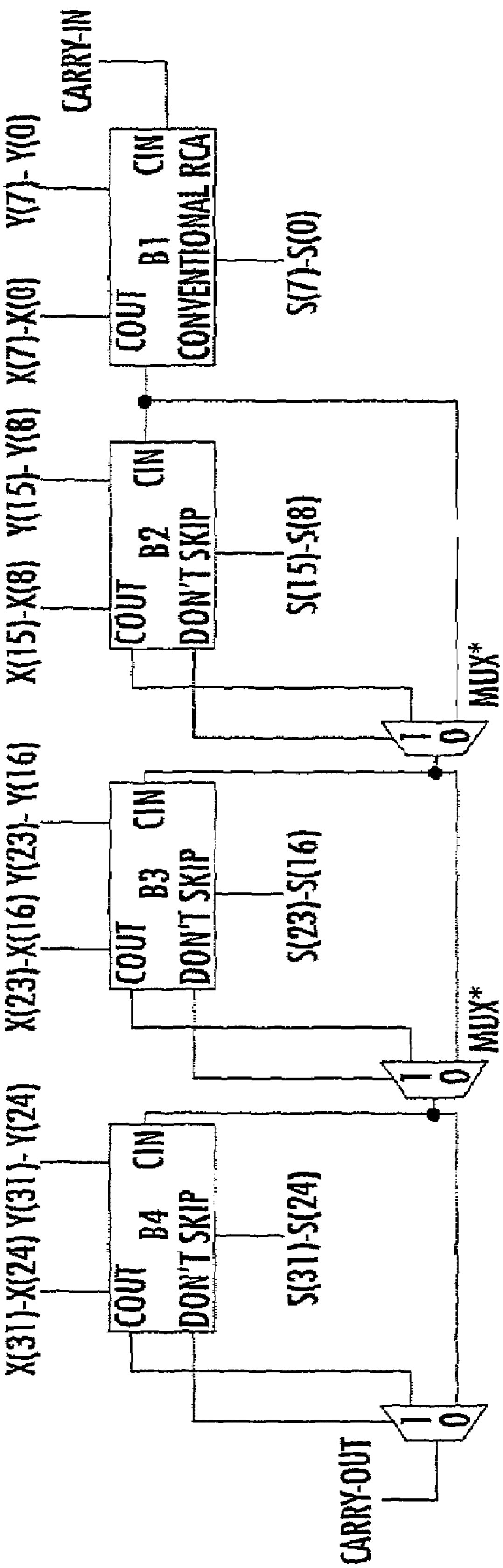
FIG. 1 is a circuit block diagram illustrating an N-bit one-level carry-skip adder according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the drawings, layers, objects and regions may be exaggerated for clarity.

As will be described herein, various embodiments of the present invention provide adders based on a novel bit block structure that generates bit associated propagation signals (bapc), which will also be referred to as "carry-strength" signals herein, in a ripple fashion. Carry-skip adder embodiments of the present invention may, thereby, be faster than traditional carry-skip adders while not being much larger. Further embodiments of the present invention provide hybrid look ahead adders providing improvements over those described in T. Lynch, E. E. Swartzlander, "A Spanning-Tree Carry-Look-Ahead Adder," IEEE Trans. on Comp., Vol. 41, n.8, August 1992 ("Lynch-Swartzlander type") and in V. Kantabutra, "A Recursive Carry-Look-Ahead/Carry-Select Hybrid Adder," IEEE Trans. on Comp., Vol. 42, n. 12, December 1993 ("Kantabutra type") as they may be significantly smaller while still being comparable in speed. These prior art adders are further described in U.S. Pat. No. 5,508,952, which was incorporated by reference above.

The novel bit block structure described herein may reduce or eliminate the delay due to the rippling at the end of the life of a long-range carry signal. The basic approach is, generally, that for each bit position k in a block $B_j$ it is determined whether the carry-in to position k comes from the block carry-in to block $B_j$, or whether the carry-in to position k is internally generated in block $B_j$. This determination is provided by a novel bit block using computed signals that start at the least significant bit (LSB) of the block and end at every bit position of the block. The complements of these are referred to as "carry-strength" signals, because they indicate for each bit position whether the carry-in to that position originates within the same bit block.

These carry-strength signals are also used in hybrid carry-look-ahead adders in various embodiments of the present invention. In such adders, the same principle described above for the carry-skip addition mechanism may be applied to bit blocks to replace the generally larger blocks designed for Lynch-Swartzlander type and Kantabutra type adders. These bit blocks may be used to avoid carry-select stages, potentially saving significant area and power with little speed loss.

As will also be described herein, the present inventors have implemented embodiments of bit blocks according to the present invention in a 32-bit carry-skip adder and a 32-bit hybrid carry-look-ahead adder realized in AMS 0.6 $\mu$m CMOS standard cells. In order to compare the new addition circuits to existing ones, several conventional adders were also realized using the same technology. The new carry-skip adder had a speed of only 5% lower than a traditional carry-look-ahead adder, taking only 59% of the layout area and consuming only 58% of the power. Surprisingly, the new hybrid carry-look-ahead adder showed a slight speed advantage with respect to the Lynch-Swartzlander type (also realized using the AMS 0.6 $\mu$m CMOS standard cells library), while taking only 76% of the layout area and consuming only 67% of the power.

The basis of a "carry strength" signal will now be described. Any bit position where the two operand bits in a carry-skip adder differ will propagate its carry in. That is, if $x_i$ and $y_i$ are the two operand bits, $c_i$ the carry in and $c_{i+1}$ the carry out, then $x_i \neq y_i$ implies $c_{i+1}=c_i$. For the sake of simplicity, assume that, as shown in FIG. 1, an N-bit one-level carry-skip adder is divided into N/M equal-length blocks (B1, B2, B3, B4) each of which contains M bits as described in Koren, I.: "Computer Arithmetic Algorithms," Prentice-Hall, 1993; Kantabutra and Nagendra, C., Irwin, J. J., Owens, R. M. "Area-Time-Power Tradeoffs in Parallel Adders," IEEE Trans. CAS-II, 43, (10), pp. 689–702. Note, however, that the present invention is not limited to equal block sizes. Moreover, let $x_i$ and $y_i$ be the two N-bit operands of the adder. Any block in which all the positions i have unequal operands ($x_i \neq y_i$) will propagate the carry into the block. That is, all the carries inside the block as well as the carry out of the block are going to be the same as the carry into the block. A block with this property will be referred to herein as a "skip block."

Normally, a long-range carry signal starts at a block $B_i$, rippling through some bits in that block, then skips some blocks, and ends in a block $B_j$. If the carry does not end at the (least significant bit (LSB or lsb) of $B_j$, then rippling occurs in that block. The worst case delay generally occurs when i=1, j=N/M, and the carry signal starts at the LSB of $B_i$ and ends at the (most significant bit (MSB or msb) of $B_j$. In such a scenario, rippling occurs through (M−1) bit positions of $B_j$. In order to eliminate/reduce the delay due to this rippling, a carry-strength (CS) or bit associated propagation characteristic (bapc) signal is defined for each bit position in an M-bit block as follows:

if k is the LSB of the block then $$CS_{k+1} = \overline{x_k \oplus y_k}, \text{ otherwise } CS_{k+1} = CS_k + (\overline{x_k \oplus y_k}).$$

In other words, for a bit position k that is not the LSB of a block of bits, the incoming carry-strength $CS_k$ is high only if the carry into the same position ($C_k$) is independent of the carry-in to the block containing that bit position. When $CS_k$=1, the carry-in $C_k$ is considered strong (independent of the block carry in). Otherwise $C_k$ is considered weak (dependent on the block carry in). Carry-strength signals may be utilized, for example, in a block in which a long-range carry signal ends. To demonstrate the utilization of carry-strength signals, consider the following two complementary cases. If $CS_k$=0, that is, the carry is weak, then $C_k$ corresponds to the block carry-in. Thus, $C_k$ can be selected to be the same as the block carry-in, which may eliminate the delay due to rippling. On the other hand, if $CS_k$=1, then $C_k$ is independent of the carry-in, and can, therefore, be determined quickly. In other words, the computation of $C_k$ may start as soon as the adder's operands appear at the bit block, without waiting for an incoming block carry-in. For these reasons, the use of carry-strength signals may reduce the delay in the ending block of a long-range carry signal. Preferably, the block carry-in is fed into a large enough buffer to support such a reduction of delay. Carry-strength signals can also be readily computed in a ripple fashion implementing the above recursive definition. Furthermore, the rippling may start when the operands are ready without having to wait for the carry-in signal. Therefore, the computation process may not influence the critical path delay for the adder.

Note that the carry-strength signal of the MSB position in a block $CS_M$ indicates whether that block can be skipped. Thus, no additional circuitry is required to compute the carry-skip signal from the bit block.

Figure 2:
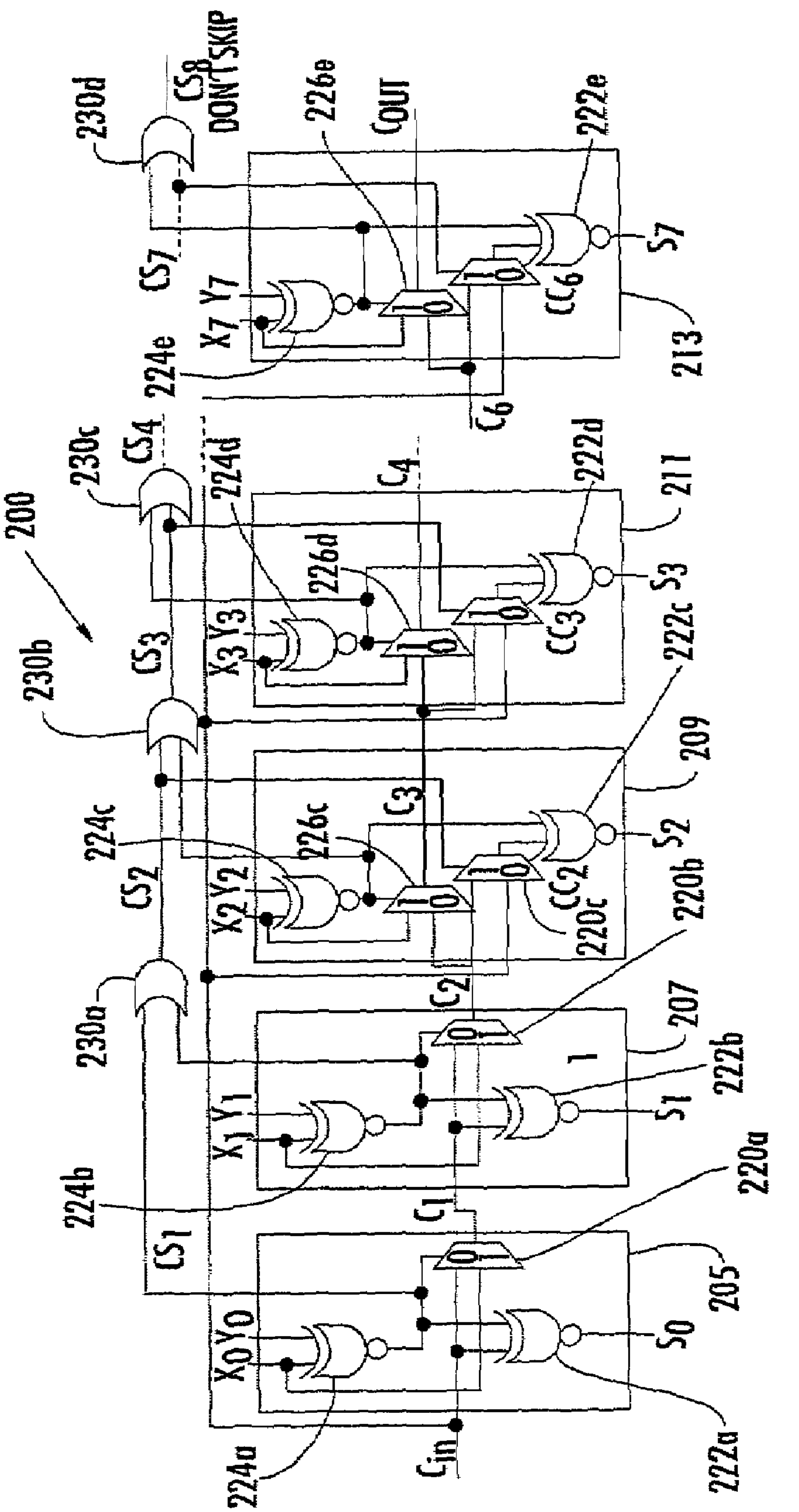
FIG. 2 is a circuit diagram illustrating an 8-bit block for a carry-skip adder according to embodiments of the present invention.

Referring now to FIG. 2, an 8-bit block 200 for a carry-skip adder according to embodiments of the present invention will now be further described. As shown in FIG. 2, the block 200 illustrated in FIG. 2 includes eight bit stages 205, 207, 209, 211, 213 (five of which are shown). Each bit stage includes an exclusive NOR gate 224A, 224B, 224C, 224D, 224E that receives the operands ($X_i$, $Y_i$). Each bit stage further includes an exclusive NOR gate 222A, 222B, 222C, 222D, 222E that generates the respective sum outputs ($S_i$). The respective LSB bit stage 205 and next to lsb bit stage 207 include a single multiplexer 220A, 220B generating a respective carry output ($C_i$) which becomes the carry input to the next most significant bit stage. Carry strength ($CS_i$) or bit associated propagation characteristic (bapc) signals which are independent of the block carry input ($C_{in}$) from another bit block of an adder including the bit block 200 are generated using the OR gates 230A, 230B, 230C, 230D. Each of the carry strength signals ($CS_i$) are generated based on respective first and second operand bits ($X_i$, $Y_i$) input to the respective bit stages and, for all except the first carry strength signal ($CS_1$) based on the preceding stage carry strength signal. Thus, the illustrated circuit implements the equations for $CS_{k+1}$ introduced above. Further note that the resulting sum bits for the bit stages 207, 209, 211, 213 are each generated based on the respective bit stage operand bits ($X_i$, $Y_i$) and the respective bit stage carry input ($C_i$). The bit stages 209, 211, 213 each include an additional multiplexer 226C, 226D, 226E, thus allowing these respective bit stages to select either the carry input to the bit block ($C_{in}$) or a calculated carry output ($C_i$) to provide as the carry input ($C_{i+1}$) into the next most significant bit stage. The initial bapc ($CS_1$) is also independent of the carry input to the block ($C_{in}$) and is based solely on the operands ($X_0$, $Y_0$) input to the lsb bit stage 205. More particularly, $CS_1$ is the exclusive NOR of the operands $X_0$, $Y_0$ input to the lsb bit stage 205.

An MSB bit stage 213 receives a bapc ($CS_7$) from a next to most significant bit stage (not shown). The MSB bit stage 213 generates a last bapc ($CS_8$) output from an OR gate 230D which may be used as a skip select signal output from the bit block 200 for use in a carry-skip adder including the bit block 200.

In other words, more generally, a first bit stage 209 generates a first bapc $CS_3$ that is used by a more significant second bit stage 211. A less significant bit stage 207 of the bit block 200 generates a third bapc $CS_2$ that is used by the first bit stage 209. A least significant bit stage 205 generates an initial bapc $CS_1$. Finally, a most significant bit stage 213 generates the last bapc $CS_8$ of the bit block 200. While described above with reference to specific stages of the embodiment of FIG. 2, it is to be understood that these references are merely to facilitate understanding of the present invention, which is not limited to the specific connection between stages illustrated in FIG. 2.

The carry-strength (CS or CSC) signals may be used without increasing the delay of the block when the carry is internally generated. In fact, the carry propagation path is unchanged with respect to that of a conventional ripple-carry adder and new signals are provided to compute sum bits. These new signals ($CC_i$) are provided to utilize the parallelism allowed by the carry-strength signals ($CS_2, \ldots, CS_7$). In fact, even though a long-range weak carry will ripple through the carry propagation path (i.e., $C_1, C_2, C_3, \ldots C_6$), the sum bits will be valid after just $\tau_{MUX}+\tau_{XNOR}$ (corresponding to delays for a multiplexer (MUX) and an exclusive NOR gate (XNOR), respectively) from the time at which the carry arrives at the block. On the other hand, if the k-th bit stage 209, 211, 213 receives a strong carry-in, the block calculates the carry-out after a delay $\tau_{XNOR}+(k+1)*\tau_{MUX}$ and the sum bit after a delay $2*\tau_{XNOR}+(k+1)*\tau_{MUX}$ from the time at which the operands ($X_i$, $Y_i$) arrive.

Figure 3:
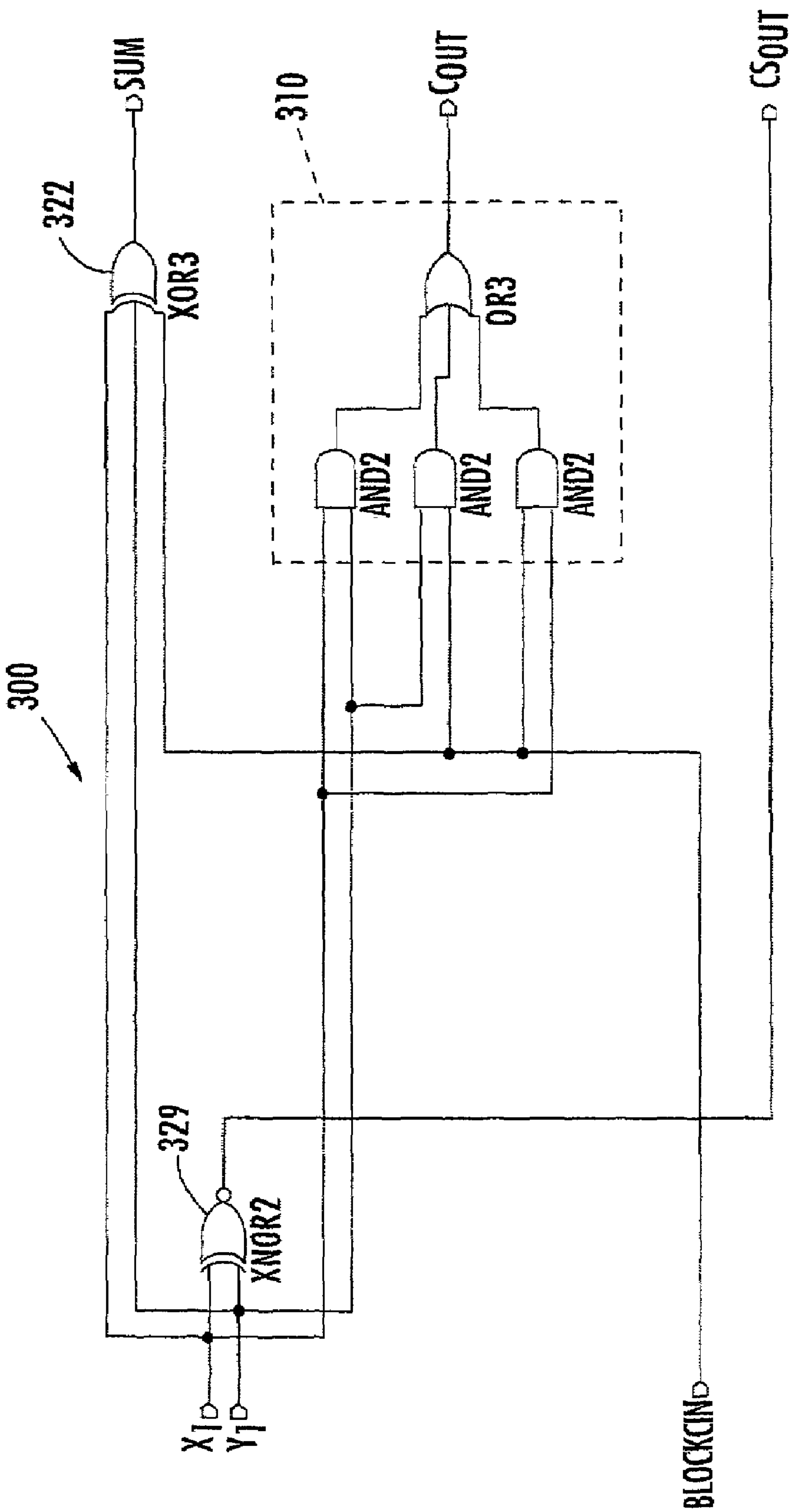
FIG. 3 is a circuit diagram illustrating a bit stage of a least significant bit according to embodiments of the present invention.

Referring now to FIG. 3, a circuit diagram illustrating a bit stage 300 of a least significant bit according to embodiments of the present invention suitable for use in an 8 bit block 200 for a carry-skip adder, such as that illustrated in FIG. 2, will now be described. Note that the least significant bit stage 300 as illustrated in FIG. 3 computes its output carry strength ($CS_{OUT}$) without using a carry strength input signal. The circuit of FIG. 3 may be utilized, for example, as an alternative implementation for the least significant bit stage 205 illustrated in FIG. 2. The least significant bit stage 300 shown in the embodiments illustrated in FIG. 3 includes an exclusive NOR gate (XNOR2) 324 which receives the operands $X_1$ and $Y_1$ to provide a carry out signal ($CS_{OUT}$) and an exclusive OR gate (XOR3) 322 which receives the operands $X_1$, $Y_1$ and the block carry in (BLOCKCIN) to provide a sum output (SUM). Finally, the embodiments of the carry out circuit 310 illustrated includes three (3) AND gates coupled to an OR gate to provide carry out signal ($C_{OUT}$) to the next most significant bit stage.

Figure 4:
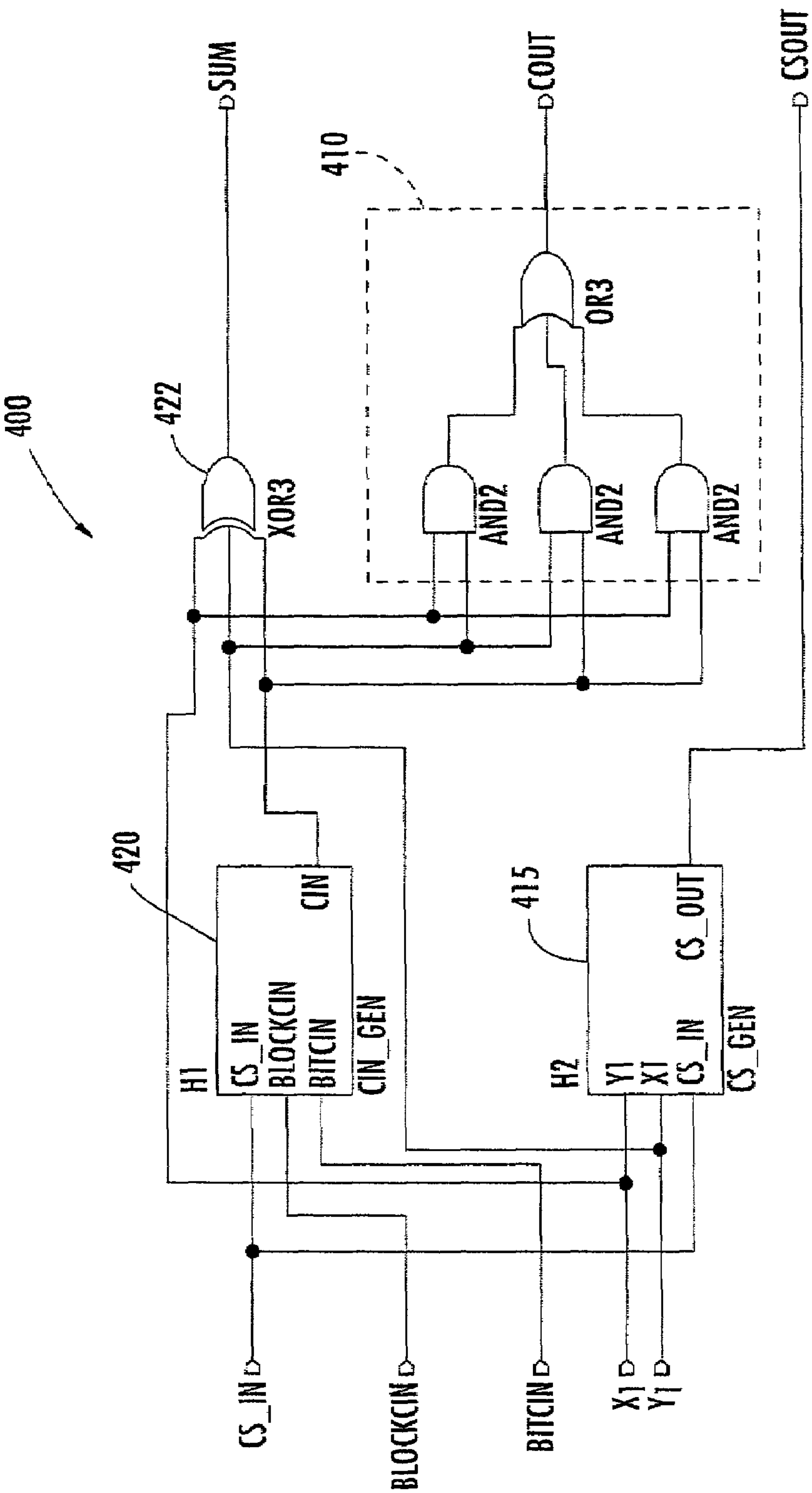
FIG. 4 is a circuit diagram illustrating a bit stage for a non-least significant bit according to embodiments of the present invention.

Referring now to the circuit diagram of FIG. 4, an embodiment of a non-least significant bit stage 400 which uses carry strength will now be described. The circuit 400 may be used, for example, as an alternative implementation of the bit stage 209 illustrated in FIG. 2. As shown in FIG. 4, the non-least significant bit stage includes a carry in generation circuit (CIN_GEN) 420 that generates the carry in signal (CIN) responsive to the block carry in (BLOCKCIN), the bit carry in to the stage (BITCIN) and the carry strength input (CS_IN) to the stage. An exclusive OR gate (XOR3) 422 generates the sum output (SUM) while the carry out generation circuit 410 generates the carry out signal ($C_{OUT}$). Finally, a carry strength generation circuit (CS_GEN) 415 generates the stage carry strength output ($CS_{OUT}$) responsive to the operands $X_1$, $Y_1$ and the carry strength input signal to the bit stage (CS_IN).

Figure 5:
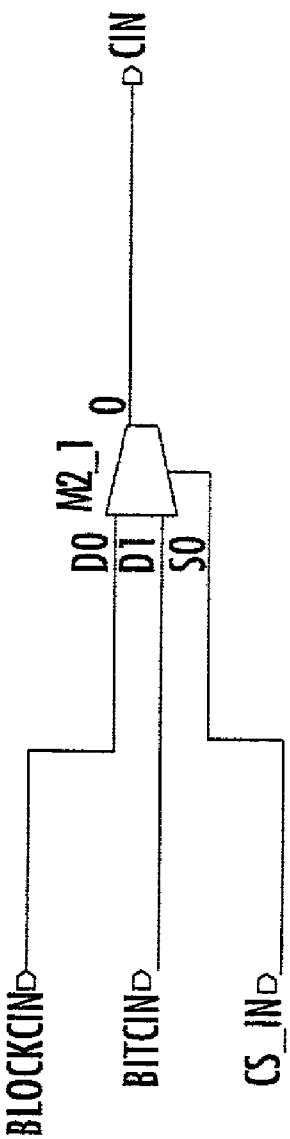
FIG. 5 is a circuit diagram illustrating an embodiment of the CIN_GEN circuit block of FIG. 4.
Figure 6:
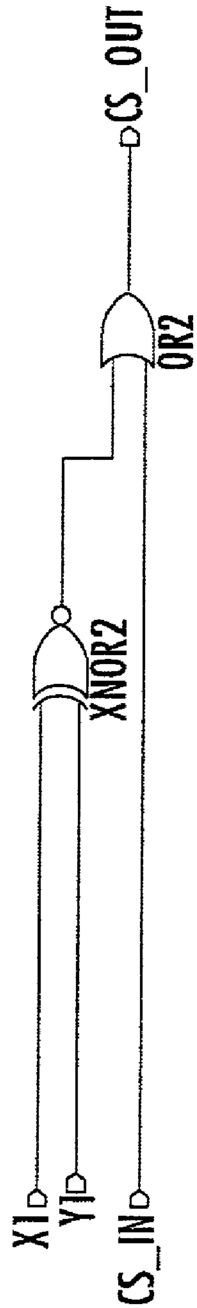
FIG. 6 is a circuit diagram illustrating an embodiment of the CS_GEN circuit of FIG. 4.

An embodiment of the carry in generation circuit 420 is illustrated in FIG. 5. Similarly, an embodiment of the carry strength generation circuit 415 is illustrated in the circuit diagram of FIG. 6.

Figure 7:
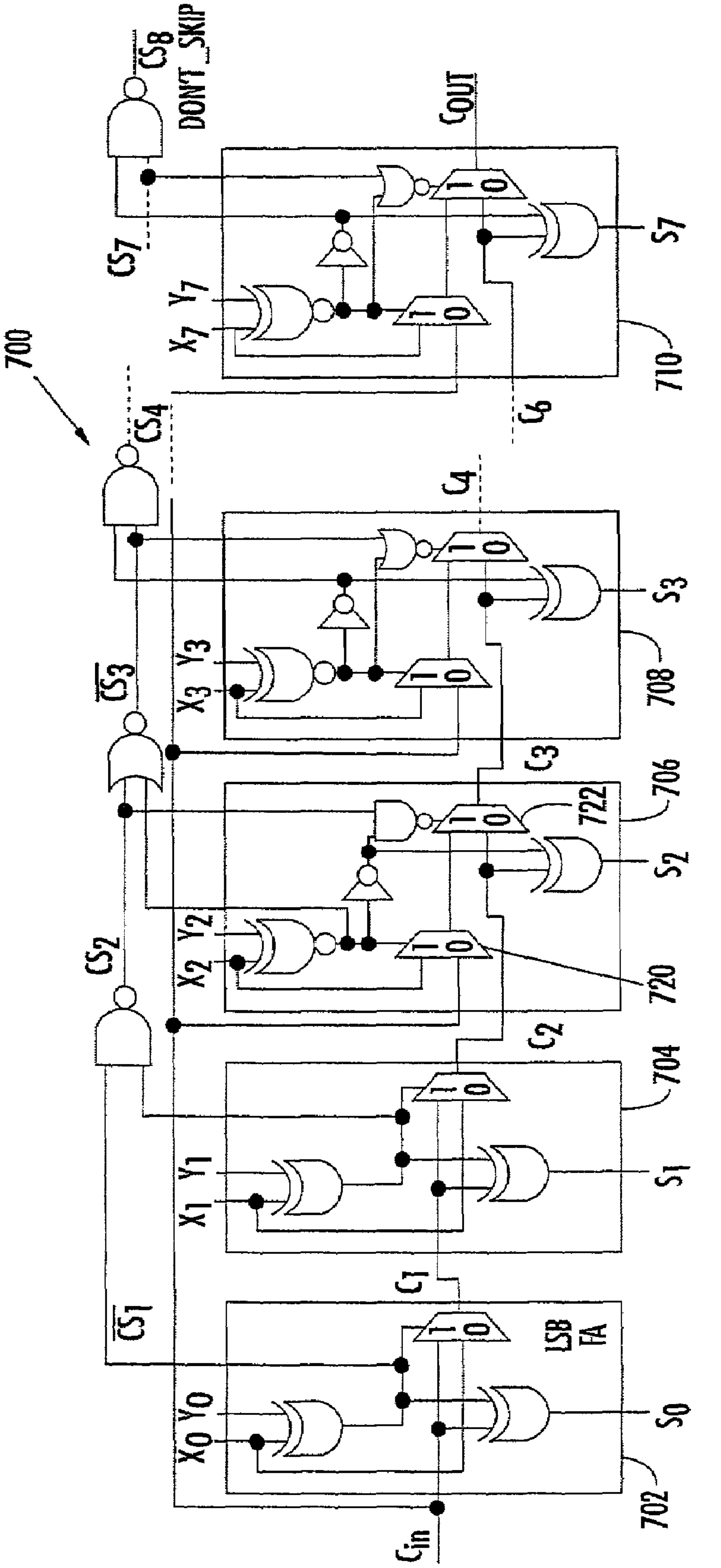
FIG. 7 is a circuit diagram illustrating an 8-bit block for a carry-skip adder according to further embodiments of the present invention.

A circuit block diagram illustrating alternative embodiments of a non-least significant bit block 700 of a carry-skip adder is provided in FIG. 7. The circuit of FIG. 7 may be utilized as an alternative to that illustrated in FIG. 2. Note that, in the circuit of FIG. 7, for even bit positions, true (non-inverted) carry-strengths (CS) are computed, whereas, for odd bit positions, inverted carry-strengths ($\overline{CS}$) are produced. The most significant bit stage 710 carry-strength $CS_8$ indicates whether or not that block can be skipped. The illustrated bit stages 706, 708, 710 are realized using a multiplexer pair 720, 722 in such a way that a ripple carry signal only passes through one multiplexer per bit stage. The latter multiplexer 722 allows selecting of the block carry-in ($C_{in}$) as the bit stage carry-output ($C_i$) when the bit stage receives a weak carry strength input ($CS_k$=0). Thus, this configuration may also reduce the delay due to the terminating phase of the carry life in a carry-skip adder.

Such delays will now be further analyzed to illustrate this aspect of the present invention. To identify the longest combinational path in a carry-skip adder using carry strength signals, the running of the most significant block in the adder will be analyzed (i.e., $B_4$) in FIG. 1. It receives the valid operands at a time $t_0$ and a valid carry-in at a time $t_c=t_0+t_p$. In the worst-case, $t_p=(\tau_{Xor}+8*\tau_{MUX})+2*\tau_{MUX}*$, where $\tau_{MUX*}\cong\tau_{MUX}$ and $\tau_{XOR}$ are the propagation delays of a 2:1 multiplexer and of both an XOR and an XNOR gate, respectively. All carry-strength signals (CS) in $B_4$ are valid after $\tau_{XOR}+6*\tau_{NAND}$ from the time $t_0$, where $\tau_{NAND}$ is the delay of both a NAND and a NOR gate. Thus, the carry-strength signals are valid when the incoming carry-in ($C_{in}$) arrives at the block 700. The first two bit stages 702, 704 (in FIG. 7) are not influenced by the carry-strength signals (CS). Note that, in some embodiments, all non-lsb stages can be influenced by the carry strength or more than two of the least significant bits may be not influenced by the carry strength. From the time $t_c$, they compute their carry-out after a delay of $\tau_{MUX}$ and $2*\tau_{MUX}$, respectively, and their sum bits after a delay of $\tau_{MUX}+\tau_{XOR}$ and $2*\tau_{MUX}+\tau_{XOR}$, respectively. More significant bit stages receiving a weak carry-in calculate their carry-out and sum bits after a delay of $2*\tau_{MUX}$ and of $2*\tau_{MUX}+\tau_{XOR}$ from the time $t_c$, respectively, which may greatly decrease the global delay.

The least significant bit stage 702 of the most significant bit block ($B_4$) may also produce a strong carry-in. In this case, the k-th bit stage calculates its carry-out after a delay $\tau_{XOR}+(k+1)\cong\tau_{MUX}$ and the sum bit after a delay $2*\tau_{XOR}+k*\tau_{MUX}$ from time $t_0$. Thus, the worst case delay of an adder such as illustrated in FIG. 1 using bit blocks as illustrated in FIG. 7, is $\tau_{NEW-1}=(\tau_{XOR}+8*\tau_{MUX})+2*\tau_{MUX*}+(2*\tau_{MUX}+\tau_{XOR})$. By comparison, the worst case delay of a conventional carry-skip adder is $\tau_{CONV}=(\tau_{XOR}+8*\tau_{MUX})+2*\tau_{MUX}+(7*\tau_{MUX}+\tau_{XOR})$. The conventional carry-skip adder may be slower in the carry-death point by $5*\tau_{MUX}$.

Figure 10:
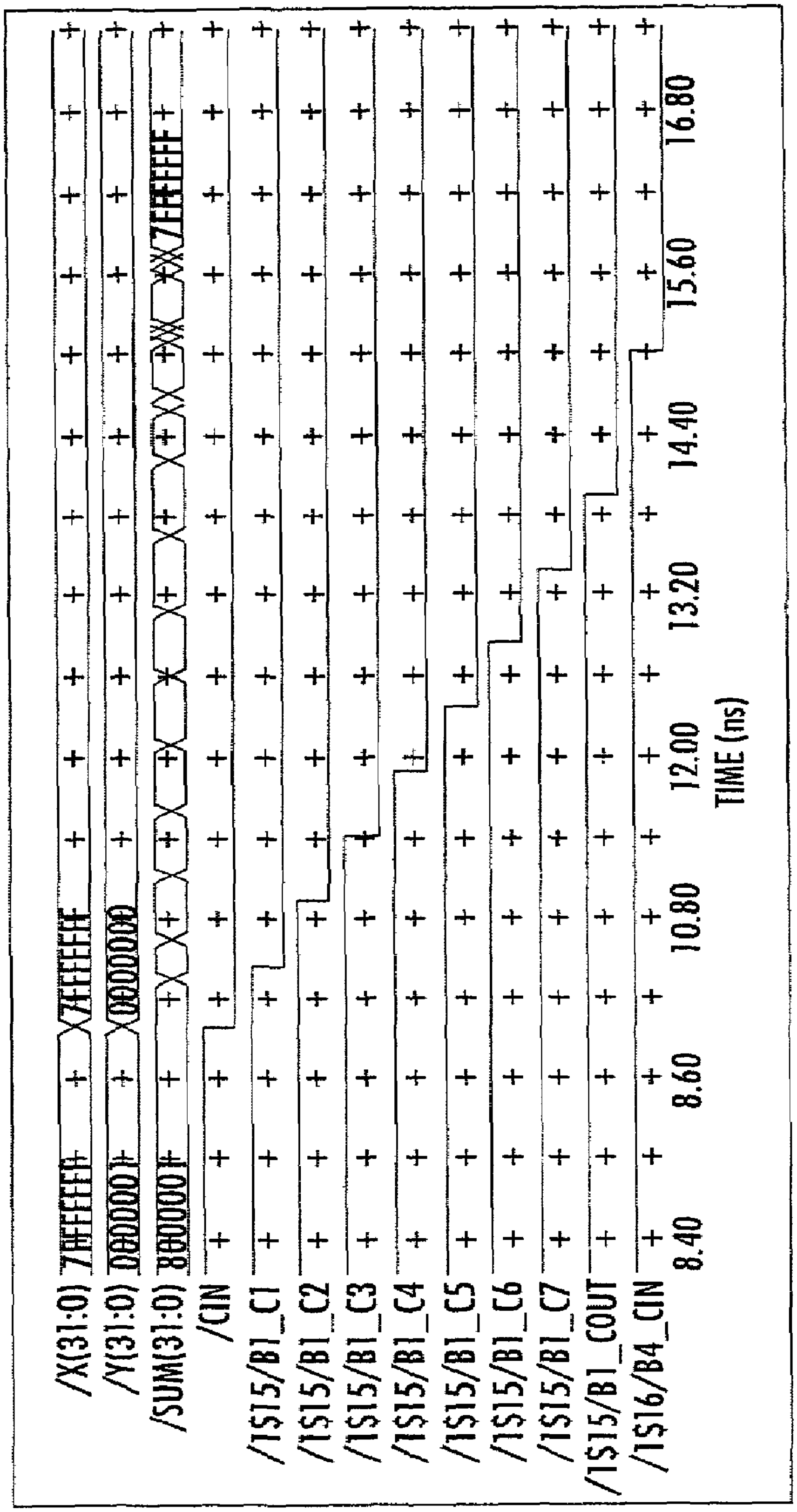
FIG. 10 is a timing diagram for a gate level simulation of the circuit illustrated in FIG. 2.
Figure 11:
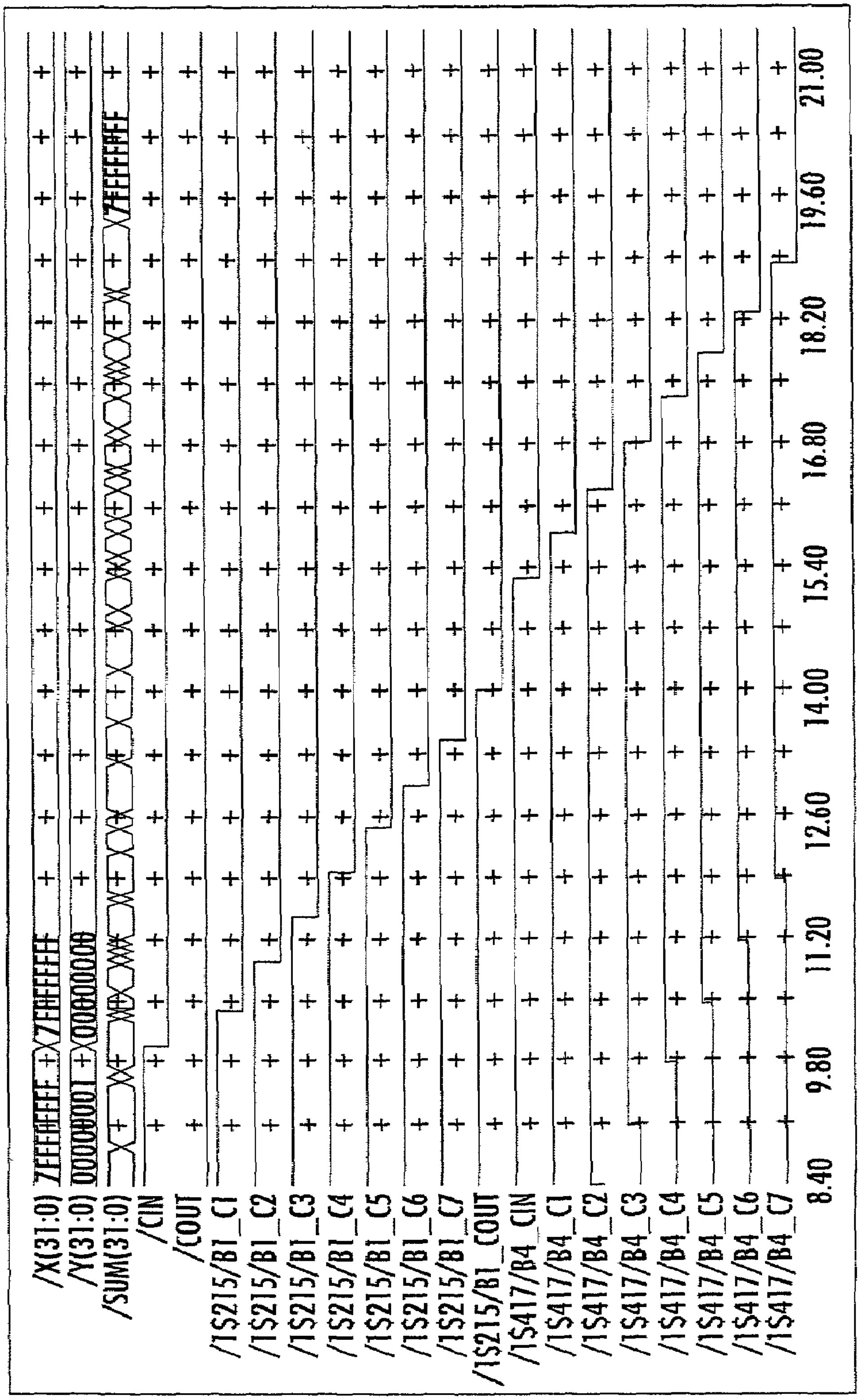
FIG. 11 is a timing diagram for a gate level simulation of a conventional carry-skip adder.

FIGS. 10 and 11, respectively, illustrate a comparison of timing based on a simulation for embodiments of a carry-skip adder according to the present invention (FIG. 10) and a conventional carry-skip adder (FIG. 11).

The non-least significant bit stages 704, 706, 708, 710 of FIG. 7 compute their carry-out bits by selecting between three different signals: A) operand bit; B) carry-in of the block; C) carry-out of the preceding bit stage. As shown in FIG. 7, a multiplexer pair 720, 722 may perform this selection. However, a 3:1 multiplexer as described herein may be used as an alternative to a 2:1 multiplexer pair. Unfortunately, the AMS Standard Cells library, as well as many other standard cell libraries, currently does not contain such a logic module and the available 4:1 multiplexer has a generally high propagation delay and chip area. For these reasons, a novel 3:1 multiplexer will now be described as illustrated by the circuit diagram of FIG. 9.

Figure 8:
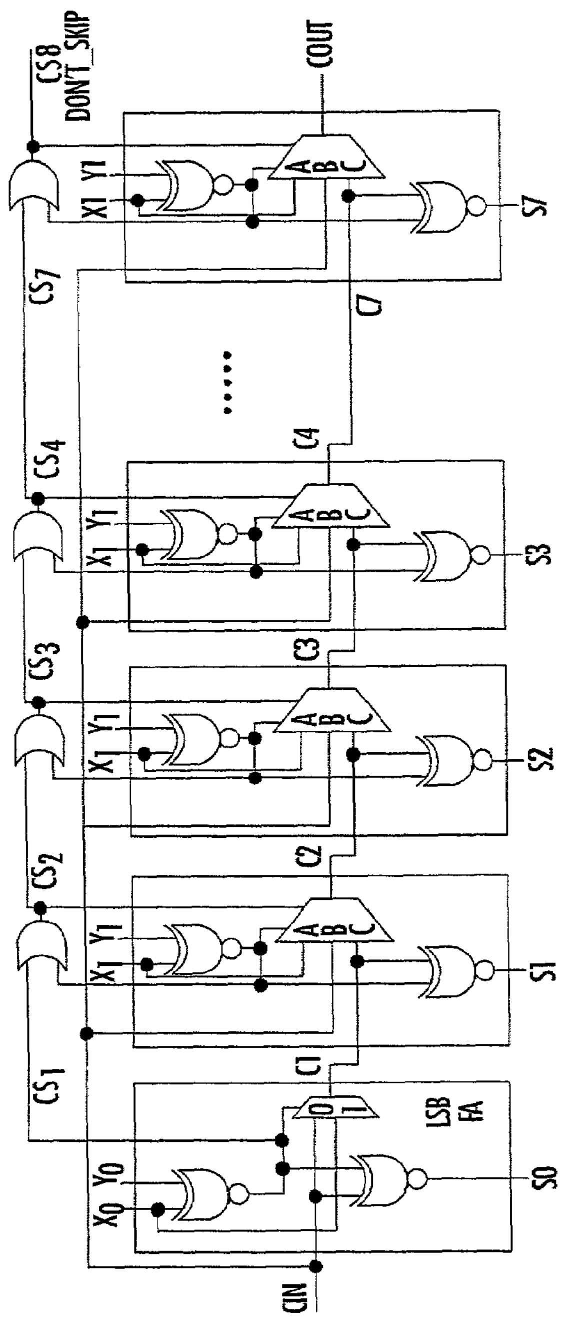
FIG. 8 is a circuit diagram illustrating an 8-bit block for a carry-skip adder according to yet further embodiments of the present invention.
Figure 9:
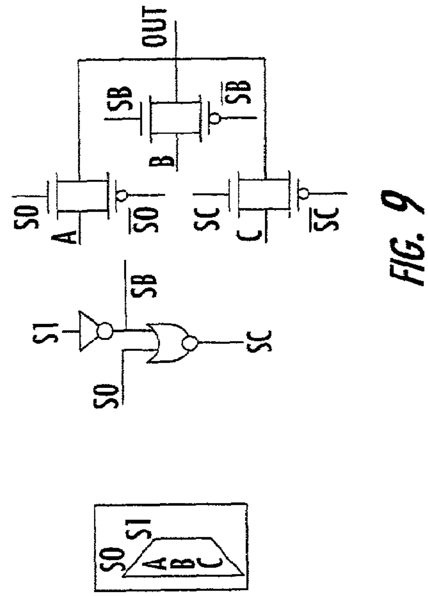
FIG. 9 is a circuit diagram illustrating a 3:1 multiplexer according to embodiments of the present invention.

As shown in FIGS. 8 and 9, the three input multiplexer includes a first input (A) coupled to one of the first and second operands ($X_i$) of the respective bit stage. The three input multiplexer further includes a second input (B) coupled to the block carry input to the bit block (Cin) and a third input (C) coupled to a calculated carry output ($C_{i-1}$) of a preceding bit stage of the bit block. A first select input ($S_0$) is coupled to the exclusive NOR output of the first and second operands ($X_i$, $Y_i$) of the respective bit stage. Finally, the three input multiplexer includes a second select input (S1) coupled to the bapc (CSi) generated by the respective bit stage. Note that the three input multiplexer illustrated in the circuit of FIG. 8 provides the following output logic: $OUT=S0A+\overline{S0S1}B+\overline{S0}S1\ C+S0\overline{S1}\ B$. Further note that, in the circuit of FIG. 8, the condition S0=1 and S1=0 will not occur.

The 3:1 multiplexer illustrated in FIG. 9 may be used in a non-least significant bit block of a carry-skip adder as illustrated in FIG. 8 to provide a further alternative to the circuit of FIG. 2. The worst-case delay for this circuit is $\tau_{NEW}=(\tau_{XOR}+8*\tau_{MUX})+2*\tau_{MUX*}+(\tau_{MUX3}+\tau_{XOR})$, where $\tau_{MUX3}$ is the delay of the 3:1 multiplexer which (in the actual load condition) may be almost equal to that of a 2:1 multiplexer standard cell.

Figure 12:
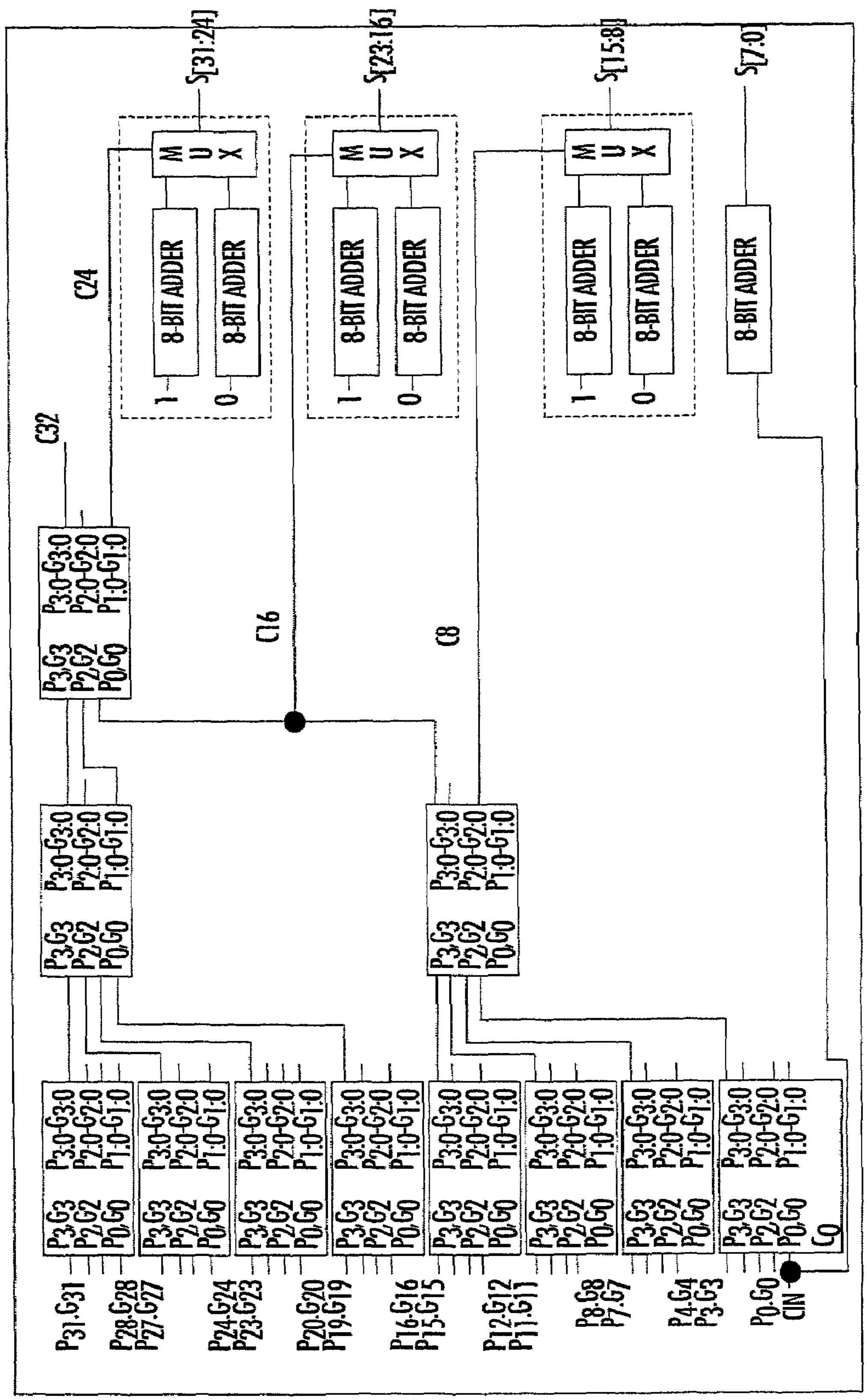
FIG. 12 is a circuit block diagram illustrating a conventional 32-bit Lynch-Swartzlander type adder.
Figure 13:
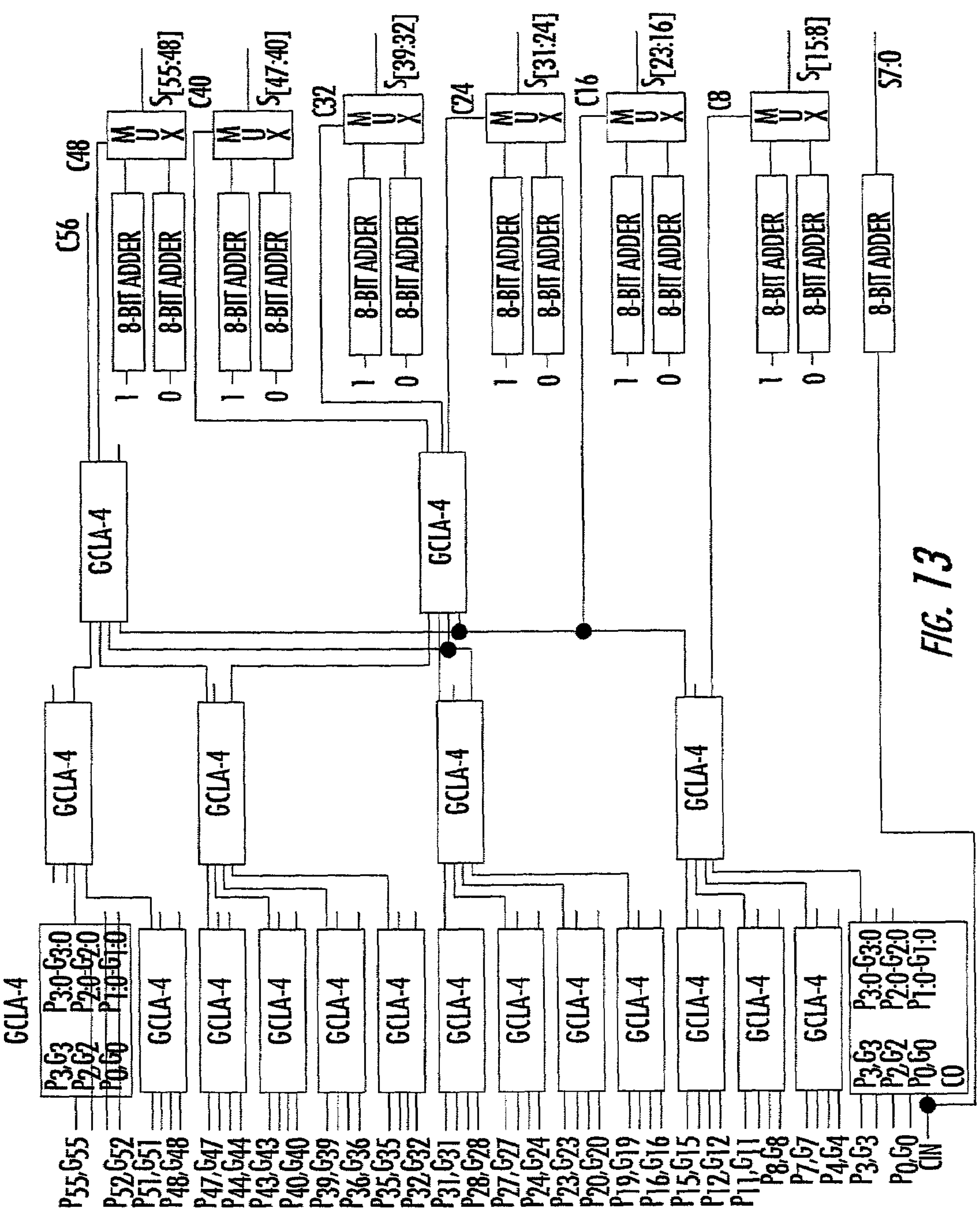
FIG. 13 is a circuit block diagram illustrating a conventional a 56-bit Lynch-Swartzlander type adder.

Hybrid carry-look-ahead adders in accordance with embodiments of the present invention will now be described. The "Lynch-Swartzlander" and "Kantabutra" type adders described above are two of the fastest known adders, however, their area requirements are generally high because of the usage of carry select stages. Using carry select stages generally implies a duplication of the sum computation circuitry and the use of a large number of multiplexers. As shown in FIG. 12, the carry tree of the illustrated 32-bit version of a Lynch-Swartzlander type adder uses 4-bit lookahead generators (GLA) 1205 to generate the carries into bit positions 8, 16, 24 and 32. The sum bits are obtained by means of 8-bit carry-select blocks 1210, which each perform their operations with two 8-bit adders in parallel with the carry tree. The carries generated by the carry tree are then used to select the valid 8-bit sum words using the respective multiplexers (MUX). This structure may further be extended to provide a 56-bit Lynch-Swartzlander type adder as illustrated in FIG. 13. Larger or smaller adders are also possible.

Note that this same principle is generally used in a Kantabutra type adder, which may reach higher speed performance due to a non-uniform carry-tree and recursive structure. Also, the Kantabutra type adder generates the sum bits by means of carry-select stages as will be described later with reference to FIG. 17. Thus, in both these hybrid carry-look-ahead adders, the delay introduced by the sum computation circuitry from the time in which the carry tree ends its computation is $\tau_{MUX}$.

In various embodiments of hybrid adders according to the present invention, the non-duplicate stages are used to obtain the sum bits. These stages may be realized as carry-skip adders using carry strength, such as described above. More particularly, bit blocks will now be described which may complete their computations during the time in which the carry tree performs carry calculations.

Figure 14:
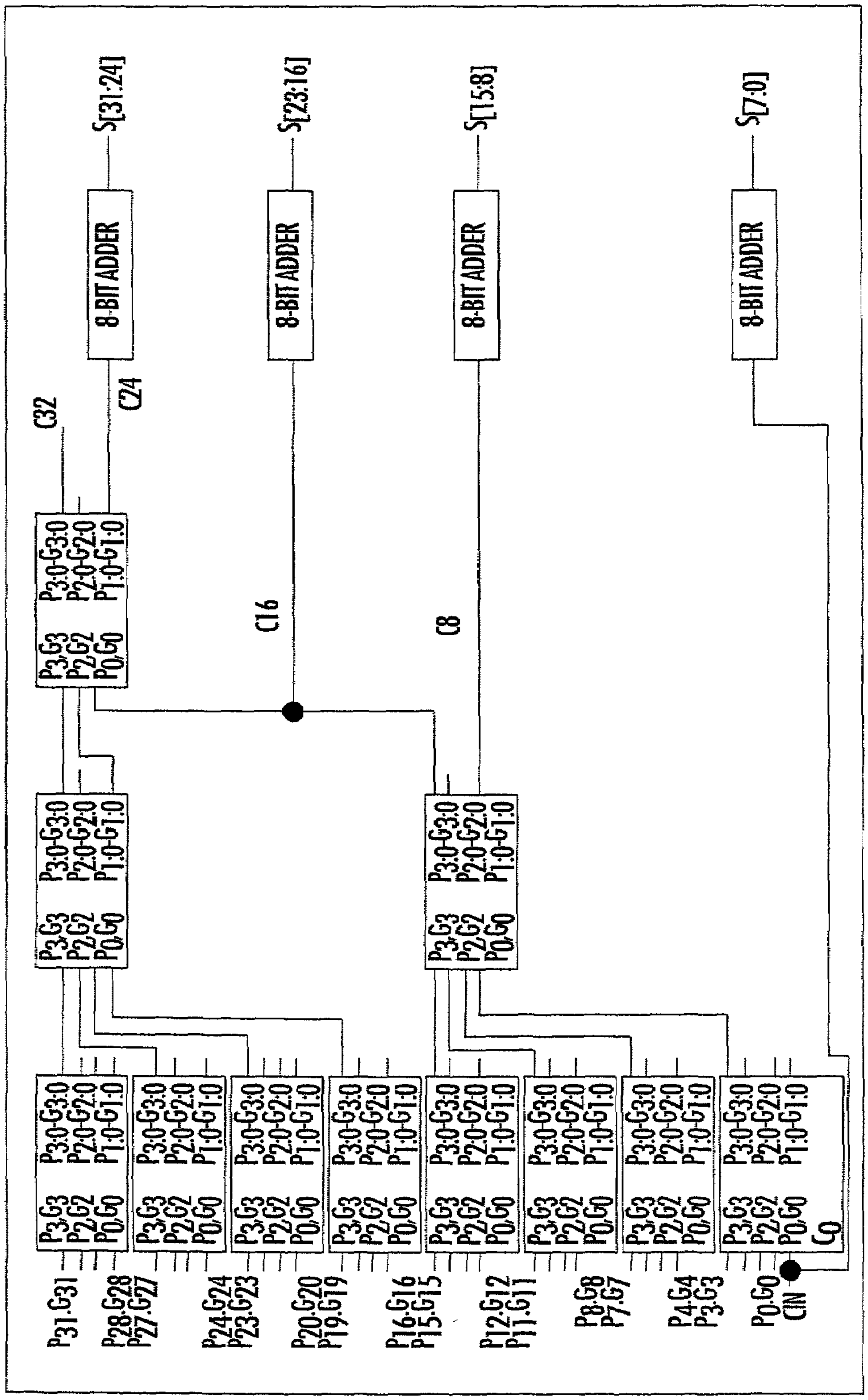
FIG. 14 is a circuit block diagram illustrating a hybrid 32-bit adder according to embodiments of the present invention utilizing a Lynch-Swartzlander type carry tree.
Figure 15:
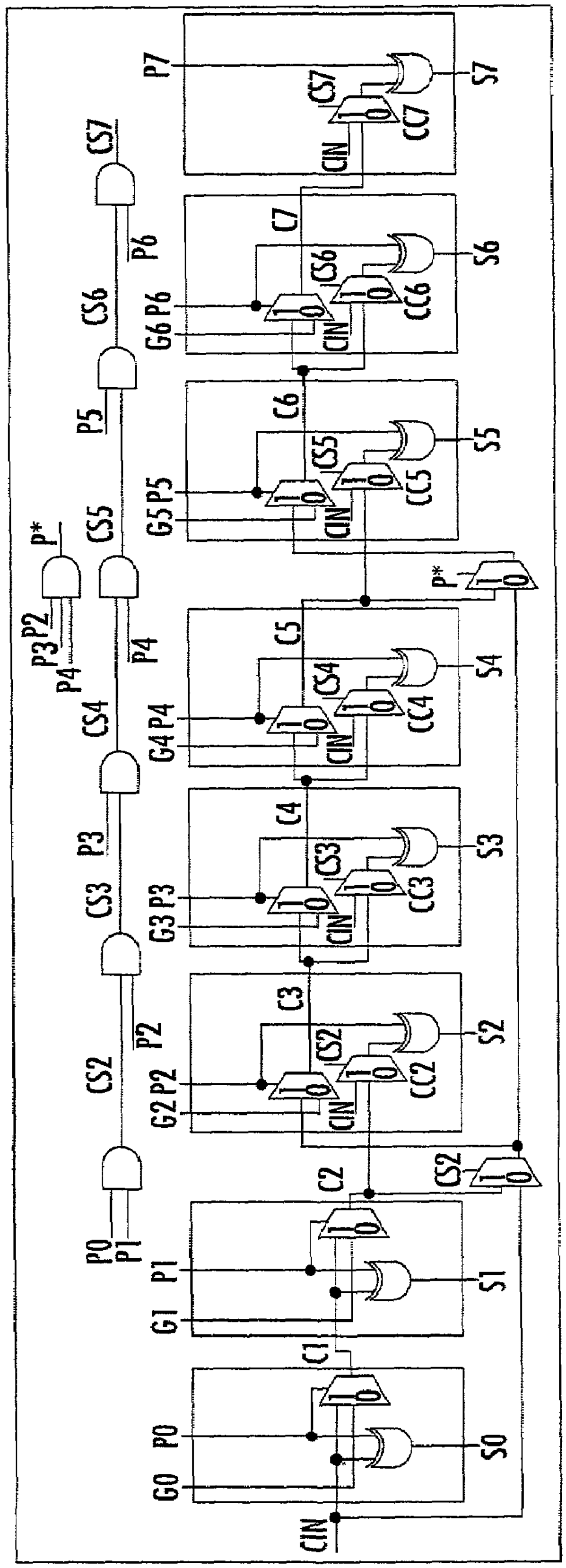
FIG. 15 is a circuit diagram illustrating an 8-bit block according to embodiments of the present invention suitable for use as an 8-bit adder in the circuit illustrated in FIG. 14.

FIG. 14 is a circuit block diagram illustrating embodiments of a hybrid adder according to the present invention having a Lynch-Swartzlander type carry tree. The 8-bit block shown in FIG. 15 illustrates embodiments of a bit block suitable for use in the 8-bit adders of FIG. 14. The signals $P_0, \ldots, P_7$ and $G_0, \ldots, G_6$, correspond to the propagate and generate terms of a Lynch-Swartzlander type adder, respectively. The bit block illustrated in FIG. 15 is organized as a carry-skip adder using carry-strength signals $(CS_2, \ldots, CS_7)$. It contributes to the global delay with $\tau_{MUX}+\tau_{XOR}$ when a weak carry-in (generated by the carry tree) dies in the block. On the other hand, when a carry is internally generated, the worst case delay of the illustrated block is $7*\tau_{MUX}+\tau_{XOR}$. Thus, the worst case delay should not be greater than that generated by a conventional carry-select 8-bit block.

With respect to carry-skip adder embodiments of the present invention, as will be described later herein, bit blocks in adders of the present invention need not be of uniform length. Furthermore, bit block lengths can be optimized using a procedure adapted from that described in Kantabutra, V., "Designing Optimum One-Level Carry-Skip Adders," IEEE Trans. on Comp., 1993, Vol. 42, n.6, pp. 759–764 which will be described further later herein. The optimization generally may start off by finding the largest MSB m-bit block such that the delay of a carry signal generated from the least significant bit of this block and terminated at the MSB of the same block is no more than some figured. Then, less significant blocks are added to the left of the first one without making the worst case delay path longer than d. This process is then reiterated until a minimum value of d is found that would correspond to an adder whose size is large enough to fit the desired specification. To this end, the fact that a carry generated in such less significant blocks will terminate (in the worst case) in a more significant block, increasing its delay by just 1 MUX, is considered.

Figure 16:
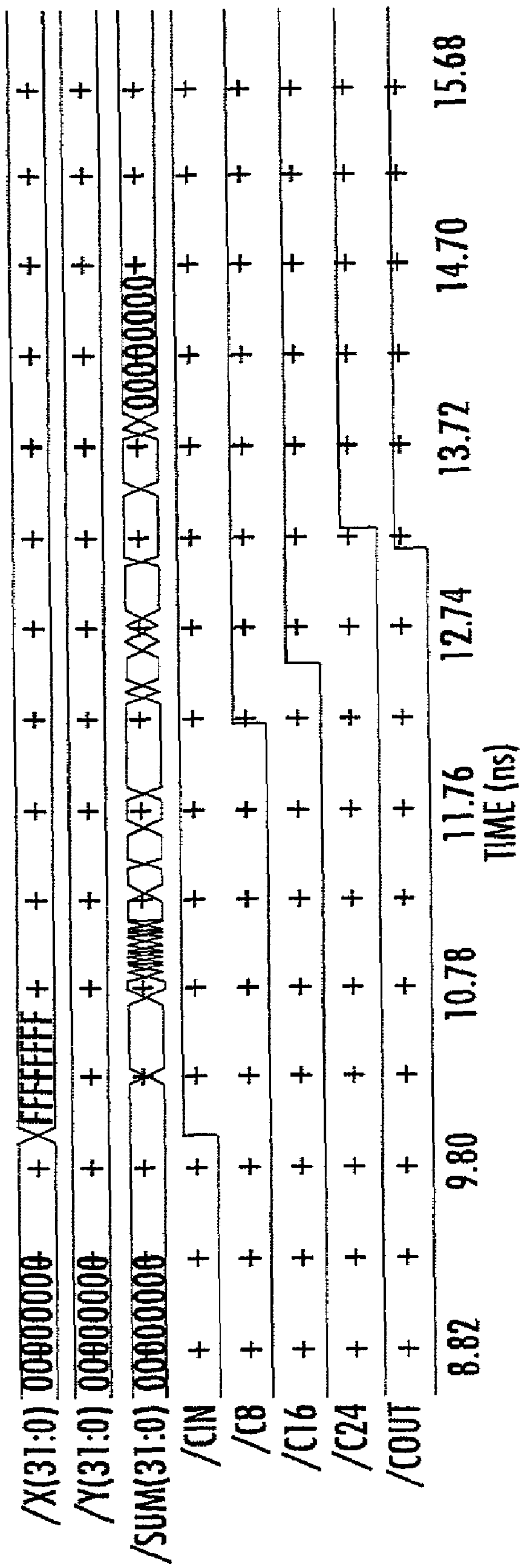
FIG. 16 is a timing diagram for a gate level simulation of the circuit illustrated in FIG. 14.

In FIG. 16, gate level simulation results for the hybrid adder shown in FIG. 14 are illustrated. Note that sum bits are computed just 700 ps later than $C_{24}$. Post-layout simulation results summarized in Table 1 below show that the new adder may allow power dissipation and area to be significantly reduced without compromising speed.

TABLE 1

| 32-bit Adders | Area [μm] | Delay [ns] | Max Power [mW] |
|---|---|---|---|
| Lynch-Swartzlander | 419244 | 4.08 | 51 |
| New Adder | 318550 | 3.88 | 34 |

Note that, under a crude gate-counting delay model, the new hybrid carry-look-ahead adder of FIG. 14 was expected to be slower than the conventional Lynch-Swartzlander type adder by about $\tau_{XOR}$. However, post-layout simulations have shown that the circuit of FIG. 14 may, in fact, be slightly faster than the conventional Lynch-Swartzlander type adder. This may be due to lower loads on the carry signals produced by the carry tree in the circuit of FIG. 14. In fact, in the circuit of FIG. 14, the carry signal lines are loaded by the input of eight multiplexers (25fF×8) while, in the conventional Lynch-Swartzlander type adder, they drive the selection input of eight multiplexers (45fF×8). Moreover, a reduction in net congestion has led to a more compact layout and shorter interconnection delays.

Figure 17:
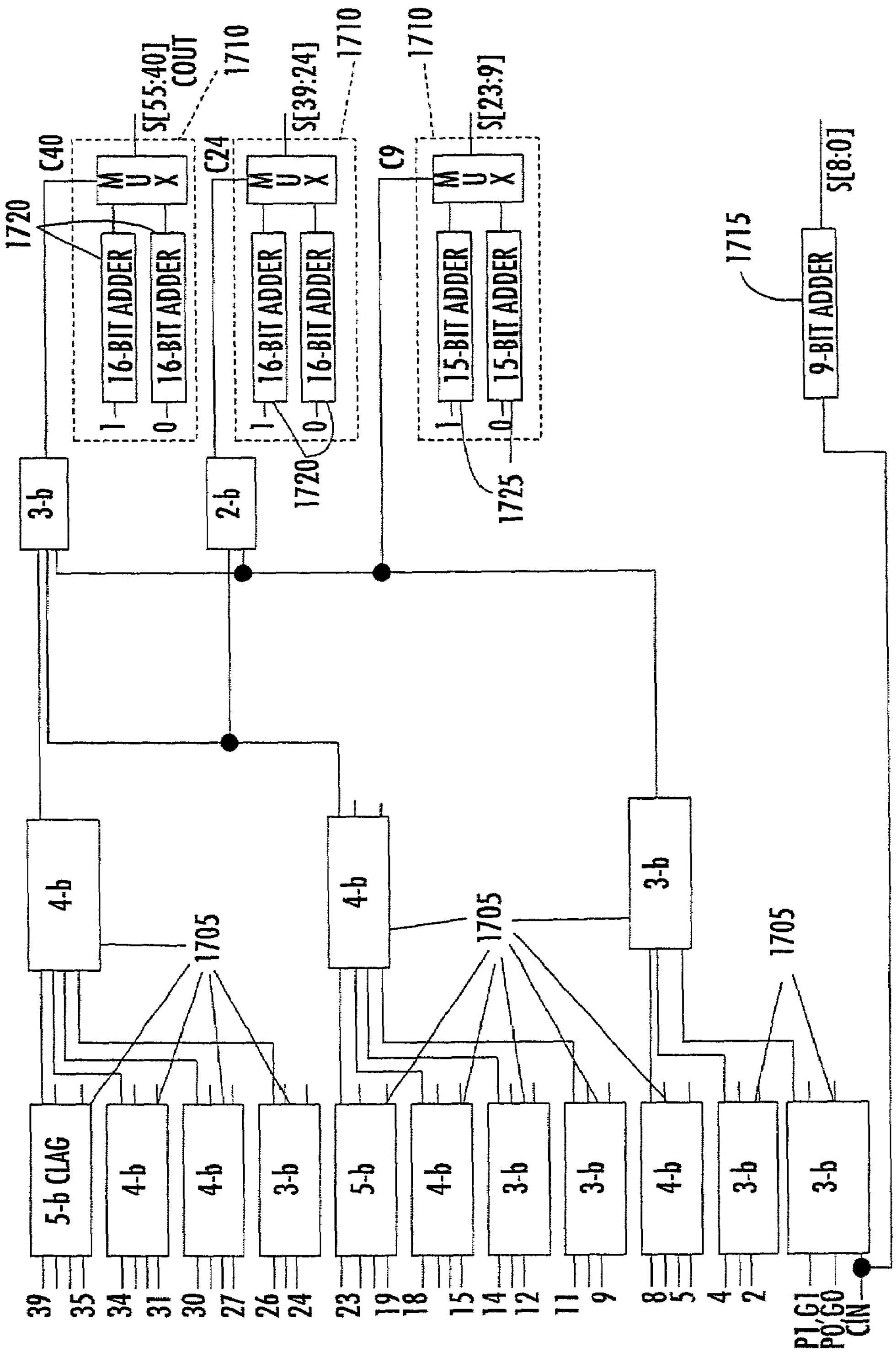
FIG. 17 is a circuit block diagram illustrating a conventional Kantabutra type adder.

Embodiments of the present invention based on a Kantabutra type carry tree will now be described. The 56-bit Kantabutra-style adder described in V. Kantabutra, "A Recursive Carry-Look-Ahead/Carry-Select Hybrid Adder" IEEE Trans. on Comp., Vol. 42, n. 12 represented an improvement on the Lynch-Swartzlander type redundant adder described in T. Lynch, E. E. Swartzlander, "A Spanning-Tree Carry-Look-Ahead Adder," IEEE Trans. on Comp., Vol. 41, n.8. A conventional Kantabutra type adder, which is based on the usage of a non-uniform carry-tree, is shown in FIG. 17. The Kantabutra type adder includes a selected number of Carry-Look-Ahead Generators (CLAGs) 1705 of various lengths providing a carry tree used to quickly generate the carries into bit positions 9, 24 and 40. The most-significant 47 sum bits are obtained by means of selected size carry-select segments 1710, which perform their operations in parallel with the carry-tree. On the contrary, the least significant 9 sum bits are computed by means of a non-duplicated adder segment 1715. All the segments may be designed so that their worst case delay is approximately the same as the worst case delay of the carry-tree. Note that both Lynch and Swartzlander type adders and Kantabutra type adders are a hybrid between carry-lookahead and carry-select adders.

In the Kantabutra type adder as described in the 1993 paper referenced above, all the 16-bit adder 1720 and 15-bit adder 1725 segments for the 47 most significant bits are themselves, in fact, carry-look-ahead/carry-select hybrid adders. Only the most significant segments have to produce carry-out bits. Each adder segment 1720, 1725 has an internal carry-tree, which generates the carries into the internal bit positions 5, 9 and 13. Using such addition segments, the worst-case delay of a Kantabutra type redundant cell adder is $\tau_{C_{40}}+\tau_{MUX}$, where $\tau_{C_{40}}$ is the maximum delay due to the Kantabutra type carry-tree from the validation of the 56-bit operands, and $\tau_{MUX}$ is the time necessary to validate the sum bits after $C_{40}$ is ready.

Figure 18:
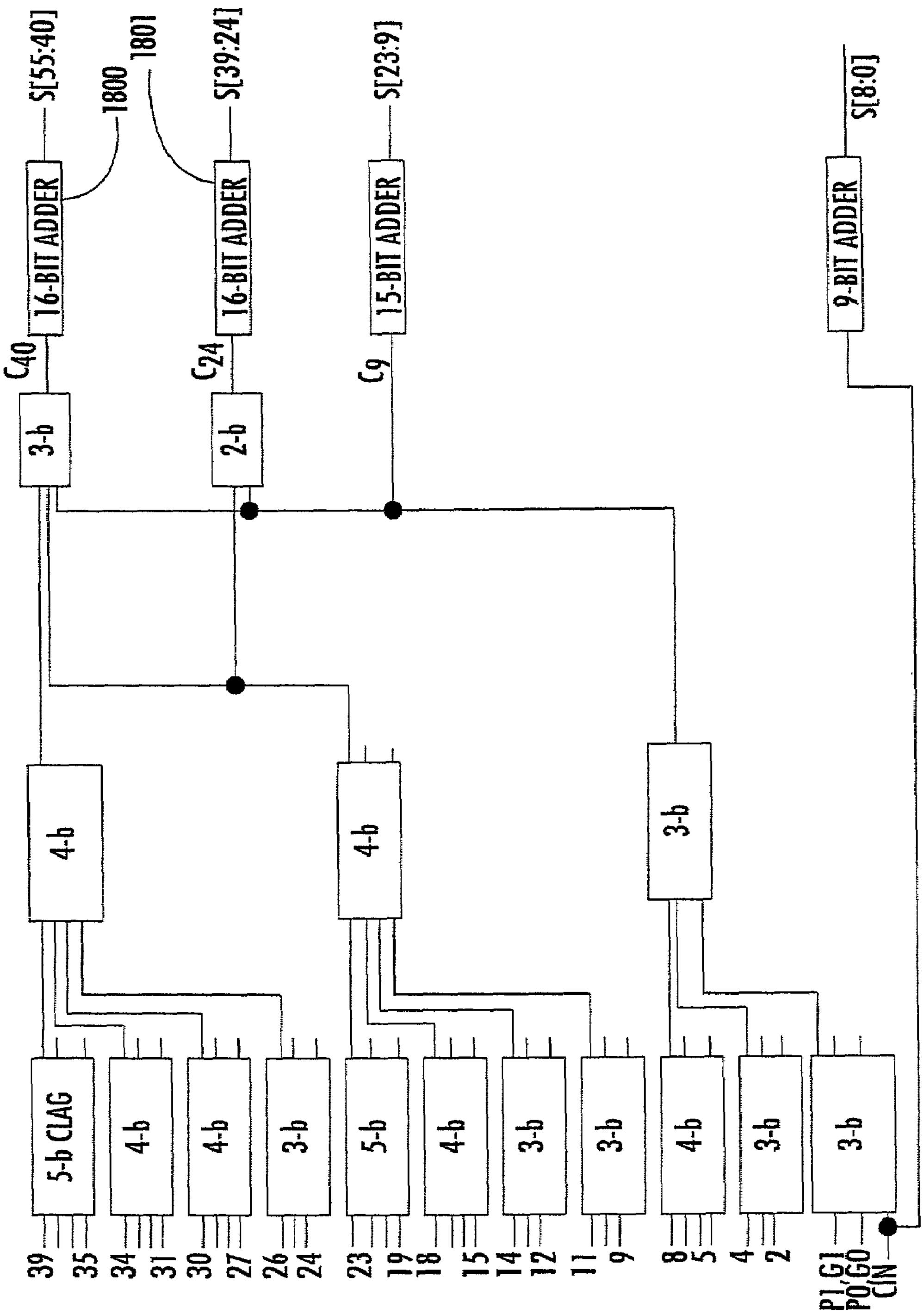
FIG. 18 is a circuit block diagram illustrating a hybrid adder utilizing a Kantabutra type carry tree according to embodiments of the present invention.
Figure 19:
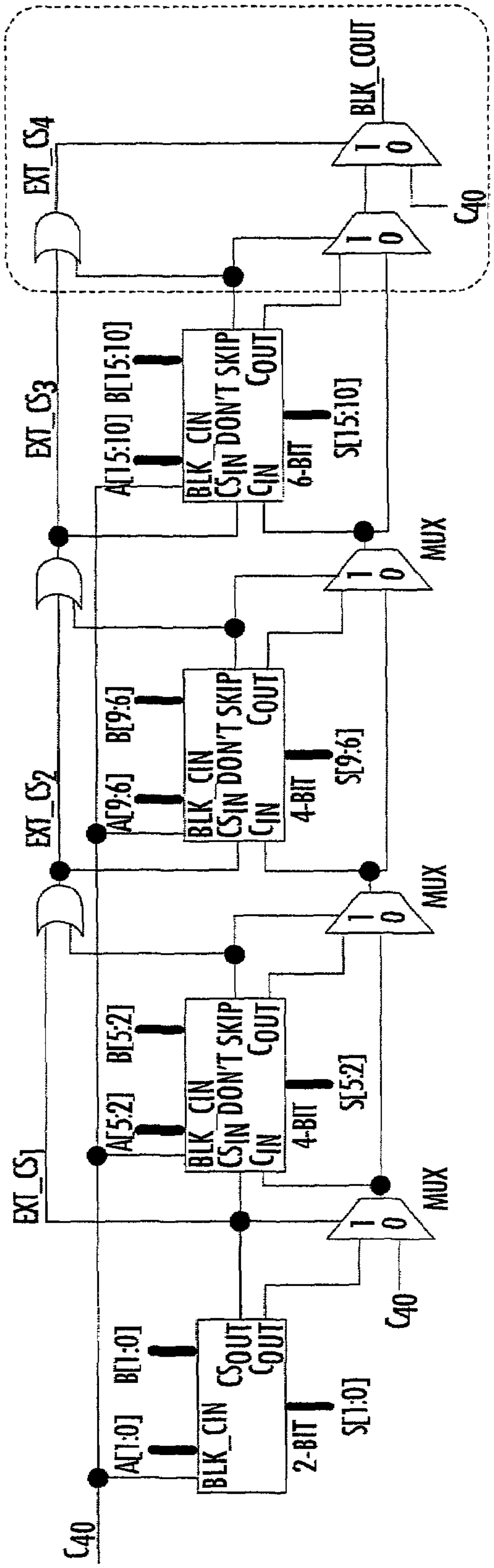
FIG. 19 is a circuit block diagram illustrating a 16-bit adder according to embodiments of the present invention suitable for use as the 16-bit adder illustrated in FIG. 18.

In various embodiments of the present invention, carry-strength or bapc signals may be used which may reduce silicon area used for the adder. The top-level architecture of embodiments of such a non-recursive redundant cell adder is illustrated in the circuit diagram of FIG. 18. Embodiments of a 16-bit adder suitable for use in the circuit of FIG. 18 are shown in FIG. 19. The 15-bit adder may be implemented in the same manner, albeit with a 2-4-4-5 rather than the 2-4-4-6 bit block sizes shown in FIG. 19. The 9-bit adder segment of FIG. 18 may be realized using a conventional carry-look-ahead adder.

The 16-bit adder of FIG. 19 may be fast enough to be ready to receive the $C_{40}$ input, which is the slowest output expected from the Kantabutra type carry-tree CLAGs. The aspects of the circuit of FIG. 18 other than the 16-bit (and corresponding 15-bit) adder will be understood by those of skill in the art and need not be explained further herein.

A problem may occur once $C_{40}$ arrives, as it may have to pass through several skip-block multiplexers. Thus, the total adder delay may not be comparable to that of a conventional type Kantabutra adder, where there is only one multiplexer delay after $C_{40}$ arrives. The long delay occurs when $C_{40}$ is to be carried all the way to the most significant block or to the carry output of the section.

Accordingly, the embodiments illustrated distinguish between internal and external (Ext_CSn) carry-strength signals. The internal carry-strength signals correspond to the carry-strength signals discussed previously. That is, the internal carry-strength input to a bit stage indicates whether the carry input to that same bit stage is generated from within the inner-level or small block that contains that bit stage. The external carry-strength input to a bit stage, on the other hand, is an indicator of whether the carry input to that same bit stage is generated from within the whole 16-bit segment shown in FIG. 19. The circuitry used to compute external carry strength is analogous to that which is used for computing internal carry-strength. However, for external carry-strength, the entire segment is treated as a big block. Note that, as computing carry-strength, internal or external, requires only a small ripple circuit, the additional cost of computing external carry-strength signals in various embodiments of the present invention is relatively small.

As shown in FIG. 19, the carry $C_{40}$ coming from the Kantabutra type carry-tree is input to all blocks through the input line Blk_cin. If the 2-bit, 4-bit and 6-bit blocks are configured as illustrated for the embodiments shown in FIGS. 20 and 21, respectively, after the signal $C_{40}$ is valid, a maximum delay of $\tau_{MUX}+\tau_{XNOR}$ may be needed to generate all the sum bits.

In order to clarify this behavior, assume the adder segment of FIG. 19 is obtaining the sum of FFFF+0000+$C_{40}$ . The above operation corresponds to a critical situation in which the carry $C_{40}$ has to propagate through the 16-bit adder segment. Referring to the lsb 2-bit block illustrated in FIG. 20, it can be seen that, in this case, the signals $\overline{P_0}$ and $\overline{P_1}$ are both low. Thus, the sum bits $S_0$ and $S_1$ are generated with a delay of $\tau_{XNOR}$ and $\tau_{MUX}+\tau_{XNOR}$, respectively, from the arrival of Blk_cin, where $\tau_{XNOR}$ is the delay due to a 2-input XNOR gate. Moreover, the carry-strength signal CSout generated by the 2-bit block is low. In the same way, due to the 2:1 multiplexers $MUX_0$*, $MUX_1$* and MUX* used in the 4-bit and 6-bit blocks shown in FIG. 21, the others sum bits also become valid after the time $\tau_{MUX}+\tau_{XNOR}$ from the generation of Blk_cin.

Figure 21:
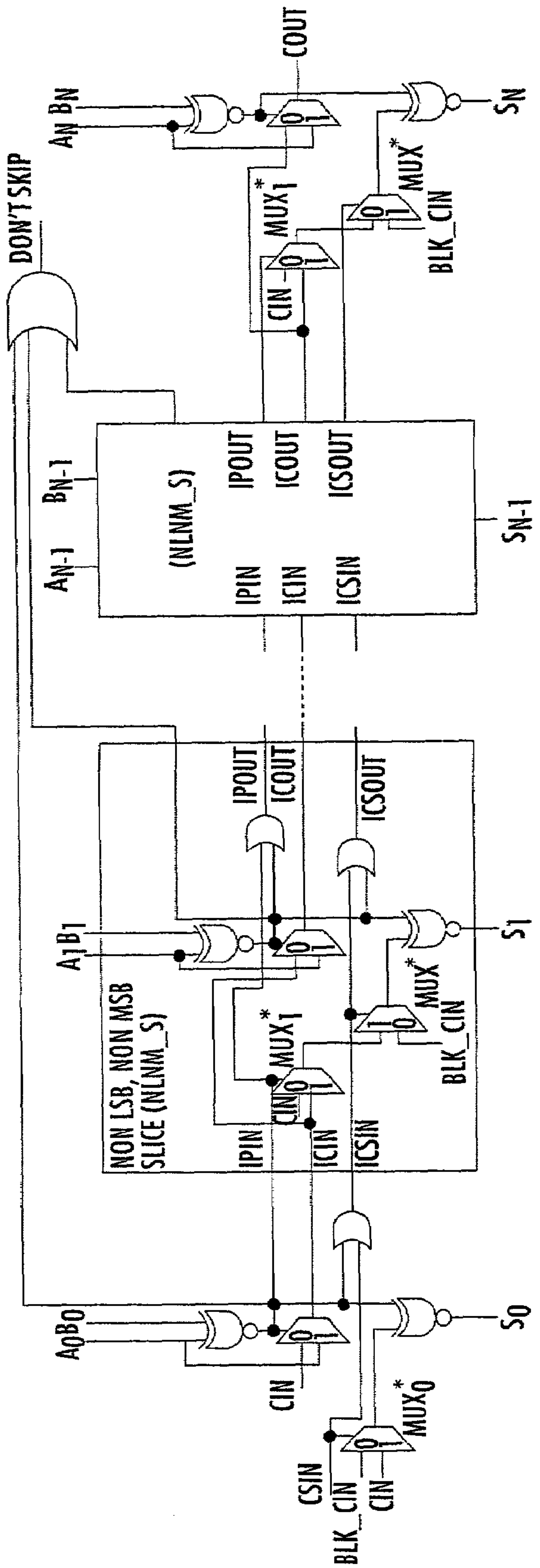
FIG. 21 is a circuit block diagram illustrating 4-bit and 6-bit blocks according to embodiments of the present invention for the adder block illustrated in FIG. 19.

Observing FIG. 21, if all the signals ICSin, IPin and "don't skip" generated into the 4-bit and 6-bit blocks are low, then all the external carry-strength signals $Ext\_CS_i$(i=1, . . . , 4) shown in FIG. 19 are also low. This implies the 2:1 multiplexers $MUX_0$* and MUX* of FIG. 21 select the Blk_cin, allowing the generic sum bit of the 16-bit adder segment of FIG. 19 to be generated with a delay of $\tau_{MUX}+\tau_{XNOR}$ from the arrival of $C_{40}$.

Figure 20:
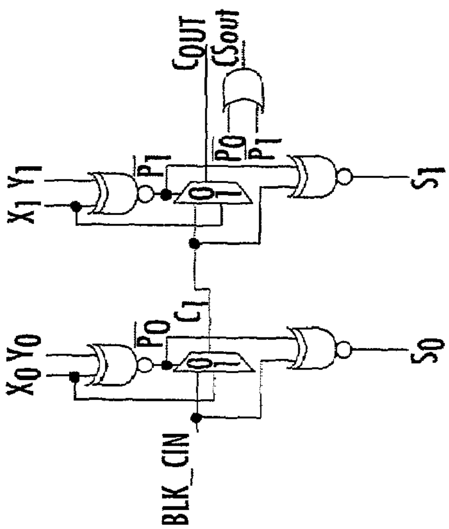
FIG. 20 is a circuit diagram illustrating a least significant 2-bit block suitable for use in the 16-bit adder illustrated in FIG. 19.

For the case in which a carry is generated in a bit stage contained in the 16-bit adder segment, different delays result. For the sake of clarity, assume a carry is generated in the least significant bit position of the 2-bit block and it is propagated in all subsequent bit positions. In this case the signals $\overline{P_0}$ and CSout of FIG. 20 are high. Consequently, all the external and the internal carry-strength signals are high. On the contrary, all the "don't skip" and IPin (FIG. 21) signals are low. Therefore, the carry produced by the 2-bit lsb block is input to each subsequent block by means of the 2:1 multiplexers (MUX) shown in FIG. 3. It can be verified that the 2-bit lsb block generates the sum bits $S_0$ and $S_1$ and the carry-out cout with a delay equal to $\tau_{MUX}+\tau_{XNOR}$ and $2\tau_{MUX}$, respectively, from the validation of the signals $\overline{P_0}$ and $\overline{P_1}$. Thus, the first 4-bit block receives its input cin after $3\tau_{MUX}$, whereas the second 4-bit block and the 6-bit block one receive their valid input cin after $4\tau_{MUX}$ and $5\tau_{MUX}$, respectively. In this case, as all the signals $Ext\_CS_i$ and ICSin are high, all the $MUX_0$* select the input cin, whereas all the MUX* select the output from $MUX_1$*. As all the selection signals IPin are low, the $MUX_1$* also select the input cin. As shown in FIG. 19, the latter corresponds to the carry-out coming from the 2-bit block. Therefore, the sum bits S[5:2] are generated with a maximum delay of $5\tau_{MUX}+\tau_{XNOR}$ from the validation of $\overline{P_0}$ and $\overline{P_1}$, whereas the sum bits S[9:6] and S[15:10] are ready after a delay of $6\tau_{MUX}+\tau_{XNOR}$ and $7\tau_{MUX}+\tau_{XNOR}$, respectively.

When a carry is generated into the least significant bit position of the first 4-bit block and it is propagated to all the subsequent bit positions, the 16-bit adder of FIG. 19 may exhibits its worst-case delay. This delay may equal to $8\tau_{MUX}+\tau_{XNOR}$ and $8\tau_{MUX}$ on the sum and on the carry-out lines, respectively.

When a carry is internally generated into a bit stage of the 16-bit adder of FIG. 19, the adder may work in parallel with the carry-tree. Thus, the adder may affect the critical case delay of the overall 56-bit addition circuit of FIG. 18. This is true when the 16-bit adder produces the sum bits with a worst-case delay greater than that of the carry-tree of at most $\tau_{MUX}+\tau_{XNOR}$. Post-layout simulations performed for the circuit of FIG. 18 have shown that the respective 16-bit and 15-bit adder segments allow the overall delay to be unaffected.

More particularly, the circuit of FIG. 18 and a conventional Kantabutra type adder have been implemented using Austria Mikro Systeme (AMS) p-sub, 2-metal, 1-poly, 5 V, 0.6 $\mu$m CMOS Standard Cells (CUB process) for 56-bit wide operands. Gate-level and transistor-level (using BSIM3v3 device models at 27° C.) simulations have been performed for both. In order to measure the worst-case delay of each realized circuit, the critical transition on operand inputs has been identified taking into account the asymmetric behavior of logic gates. On the other hand, power measurements have been performed for the operand transition, which appears to produce the maximum number of gates switching (FFFFFFFF+FFFFFFFF+0→FFFFFFFF+00000000+0), assuming a 40-MHz repetitive frequency. Simulation results are summarized in Table 2 below.

TABLE 2

| Adder | Delay [ns] | Area [$\mu m^2$] | Max Power [mW] |
|---|---|---|---|
| Original Adder | 3.93 | 1179360 | 160.4 |
| New Adder | 3.81 | 634000 | 112.3 |

Note that, under a crude gate-counting delay model, one would expect the new adder to be slower than the original one by about $\tau_{XNOR}$. However, the post-layout simulation results of Table 2 show that the new adder may be faster than the original. This speed superiority of the new adder may be due to the fact that, in the new adder, the carry signals $C_9$, $C_{24}$ and $C_{40}$ produced by the carry-tree drive a load lower than in the original adder. In fact, $C_9$, $C_{24}$ and $C_{40}$ in the conventional adder drive the selection input of 15, 16 and 17 2:1 multiplexers, respectively. On the contrary, in the adder of FIG. 18, the same signals drive the data input of 15, 16 and 17 2:1 multiplexers, respectively plus an XNOR gate's input. For the Standard Cells library used for this implementation, the selection input, the data input of a 2:1 multiplexer, and the XNOR input correspond to a load capacitance of 45 fF, 25 fF and 60 fF, respectively. Thus, the loads expected on the $C_9$, $C_{24}$ and $C_{40}$ lines have been reduced up to 37%. This may improve performance.

Moreover, examining the routing channel of both layouts a reduction of about 19% has been observed in wiring congestion of the new adder with respect to the conventional one. This may lead to a more compact layout and shorter interconnection delays.

Further aspects of the present invention recognize that a carry-skip adder can take advantage, especially in terms of speed performance, of the use of appropriately sized blocks. Guyot, A., Hochet B. Muller J. "A Way to Build Efficient Carry-Skip Adder," IEEE Transaction on Comp., Vol. C-36, n. 10, 1989 came up with a geometrically appealing technique for calculating the block sizes. However, their technique gave results that, even theoretically, were two (2) gate delays from optimum. Kantabutra, V. "Designing Optimum Carry-Skip Adders" IEEE Symposium on Computer Arithmetic, 1991 and Kantabutra, V. "Designing Optimum One-Level Carry-Skip Adders," IEEE Trans. on Comp., Vol. 42, n. 6, pp. 759–764, 1993 improved the procedure to achieve optimality. An optimization approach for selecting block sizes for bit blocks of an N-bit carry-skip adder according to embodiments of the present invention will now be described.

To minimize the longest possible carry signal life in the carry-skip adders such as described herein, the N total bit positions are partitioned into blocks to improve performance. To see what best performance may be obtained, a method of representation of bit blocks similar to the one used in GUYOT A., HOCHET B., MULLER J.: "A Way to Build Efficient Carry-Skip Adders", *IEEE Transaction on Comp.*, Vol. C-36, n. 10, 1989 and in KANTABUTRA, V.: "Designing optimum carry-skip adders", *IEEE Symposium on Computer Arithmetic,* 1991 will be used.

Figure 22:
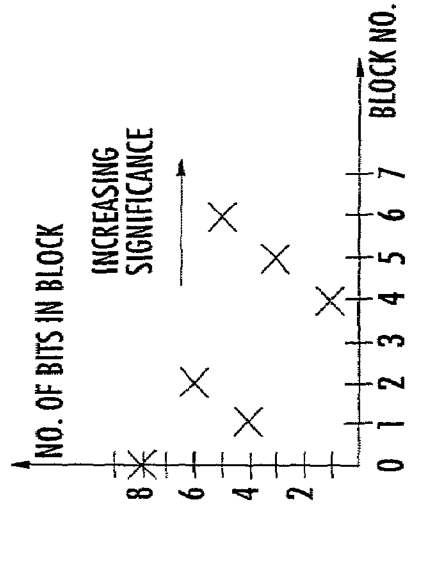
FIG. 22 is a graphical illustration of a number of bits in a block for respective block numbers of an adder.

Consider an X-Y plane as shown in FIG. 22. Let the bit blocks be numbered 0, 1, 2, . . . , when taken from MSB to LSB. If block b has a nonzero number, say m(b), of bits, then mark the point (b, m(b)) with an x-shaped marker representing the number of bits in a block as shown in FIG. 22. If $\mu$ is the set of all blocks with nonzero number of bits, then $$\sum_{b\in\mu} m(b) = N$$

holds. Let r, s denote the time to ripple one bit position and skip one block of bits, respectively. The time for a carry signal to ripple from the LSB of a bit block to the MSB of the same block is then r×(m(b)−1). This time is based on the distance between the LSB and MSB, which is m(b)−1 bits, and also on the fact that it takes r units of time to travel the distance of 1 bit.

Note that a carry signal with the longest possible lifetime may be of two different types:

(1) One that starts at the LSB of some block, ripples to the end of that block, then skips 0 or more blocks, and dies in yet another block.

(2) One that starts at the LSB of some block, ripples to the end of that block, then skips 0 or more blocks including the most significant block, and emerges as the carry out of the entire adder.

However, a carry of the second type generally doesn't live longer than one that dies in the most significant block. Therefore, optimization operations may be based on the first type of carry. The ignored second type of carry can, if desired, be handled with only slight complications, but for simplicity of explanation, will be neglected below.

Now suppose $b_1$ and $b_2$ are two blocks in $\mu$, with $b_2$ being the more significant block. Furthermore, let $\alpha$ be the time that a carry signal takes to die in a block where it is absorbed. Note that $\alpha$ may be a small constant, comparable to one or two units of ripple or skip time. The longest possible carry life in the entire adder may then be given by the expression:

$$\max_{\substack{\forall b_2, b_1 \in \mu \\ b_2 > b_1}} \{r \times (m(b_1) - 1) + s(b_2 - b_1 - 1) + \alpha\}.$$

This carry life follows from the 3 phases of life of a long-range carry signal corresponding to long range carry type (1) discussed above. The first, second, and third terms in the expression represents these 3 phases. The optimization described herein can also be used if the adder happens to have a carry input to the least significant bit position, a case omitted in this discussion for simplicity.

Optimization operations, using the terminology introduced above, are based on a class of right triangles, as opposed to the isosceles triangles used for optimization of ordinary carry-skip adders as described in KANTABUTRA, V.: "Designing optimum carry-skip adders", *IEEE Symposium on Computer Arithmetic,* 1991; Kantabutra, V.: "Designing Optimum One-Level Carry-Skip Adders," IEEE Trans. on Comp., 1993, Vol. 42, n.6, pp. 759–764. These right triangles both lend geometric intuition to the description herein and are the basis for optimization operations.

Let $\rho$=s/r (skip time/ripple time), and let $\Delta_\rho$ be the set of all right triangles whose base lies on the X axis of FIG. 22, whose left side is vertical, and whose right side has a slope of $-\sigma$. For these triangles, the shape made by the markers on the X-Y plane of FIG. 22 for an optimum-speed adder conforms to the sloped side (side with negative slope) of such a triangle. More precisely, all "X" markers except the one on the Y axis, lie within the triangle. The marker on the Y axis may be above the triangle's apex. The adder optimization operations may, thus, be directed to problem to one of finding the smallest triangle $\delta_{\rho min} \in \Delta_\rho$ that contains at least N bits. (As noted, the marker on the Y axis may be slightly above the apex of $\delta_{\rho min}$). Note that, when a marker is described herein as "conforming" (or "conforms") to the sloped side of a triangle $\delta$, it means that the marker's y coordinate allows the marker to be inside or on $\delta$.

Given any member $\delta \in \Delta_\rho$ of height h, let $A_h$ be an adder whose markers conform to the sloped side of $\delta$, except that the marker on the Y axis is allowed to be have a y coordinate of up to $\lfloor h+\alpha/r \rfloor$. In this case, then the maximum carry life in $A_h$ is, at most, $r(h-1)+\alpha$. Furthermore, an adder whose block sizes have markers that don't all fit into some such triangle of height h will have a larger maximum carry life than this expression.

Consider a carry that simply starts at the LSB of the most significant block, ripples through the block and then dies at the MSB. The life of this carry signal is $r\times(m(b)-1)$ where m(b) is the size of the most significant block. Thus, the life of such a carry is $r\times(\lfloor h+\alpha/r \rfloor-1)\leqq r(h-1)+\alpha$. Furthermore, consider a carry that starts at another block, but dies at the adder's MSB, which is in the most significant block. Because the slope of the triangle is equal to the ratio $\rho$ between the skip time and the ripple time, the maximum life of such a carry from the moment of generation to the point of reaching the border of the most significant block is no more than the expression $r(h-1)$. Adding the carry absorption time by the most significant block gives the carry a total carry life of, at most, $r(h-1)+\alpha$.

Furthermore, an optimum speed adder can be found among adders whose block sizes fit within a member of $\Delta_\rho$, except the marker for the most significant block, which has the coordinates $(0,\lfloor h+\alpha/r \rfloor)$. The problem of finding an optimum-speed adder with b bits in a given technology and circuit topology can be reduced to the problem of finding the smallest triangle in $\Delta_\rho$ within which we can fit a set of blocks containing b bits can be fit.

From the above, an algorithm and actual software for determining the bit block sizes for an optimum-speed adder have been developed. The code given in the appendices attached hereto finds optimum bit block sizes, given the ratio $$\rho = \frac{\text{skip time}}{\text{ripple time}}$$

and other adder parameters.

Figure 23:
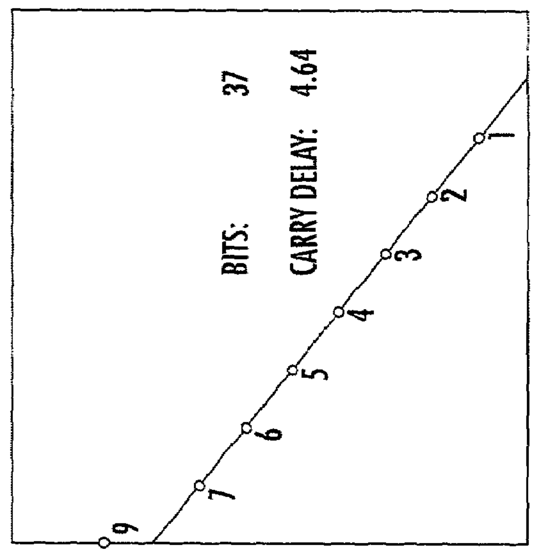
FIG. 23 is an optimization output graphical presentation for a 32-bit adder optimized according to embodiments of the present invention.

FIG. 23 illustrates an output of the program optimize.cpp in the appendices for a 32-bit adder for actual experimentally obtained parameters using AMS 0.6 um CUB process. Also included in the appendices is a computer program csagen.pl in the Perl language that generates carry-skip adders according to embodiments of the present invention. The bit block sizes from the optimize.cpp or from another source of the block size information are input to the Perl language program as command-line arguments. The program csagen.pl uses as input the various *.vhdl files also provided in the appendices. The csagen.pl program outputs the code in the *.vhdl files in an appropriate order, interspersed with code that it outputs directly with "print" statements.

Referring again to FIG. 23, the experimental parameters input to the program are actually obtained from an adder with equal-sized blocks because such parameters typically do not depend much on block size. These parameters used for FIG. 23 are: ripple time=0.52 ns, skip time=0.52 ns, giving $\rho$=1.0. The absorption time for the architecture and technology used is 1 ns.

The optimization procedure described above has been applied to optimize the block sizes of a 32-bit carry-skip adder using carry strength signals. As expected, non-uniformly sized blocks were found more appropriate to reach higher speed performance. In fact, the optimization procedure gave rise to the following block sizes: 2-4-5-6-7-8, with the largest block on the MSB side.

This 32-bit adder has been laid out using the AMS 0.6 um p-sub 2-metal 1-poly 5V "CUB" CMOS technology and post-layout simulations have been performed to measure its addition time and its maximum power dissipation. Obtained results are summarized in Table 3 below where the silicon area occupied is also reported. For the sake of comparison reliability, an optimized version of a conventional, one-level carry-skip adder has been derived using the optimization criterion detailed in Kantabutra, V. "Designing Optimum Carry-Skip Adders," IEEE Symposium on Computer Arithmetic, 1991. The data given in Table 3 shows how the use of carry-strength signals and the optimization method described herein results in an adder that outperforms the conventional, optimum, one-level, carry-skip adder. In fact, it can be seen that a gain in speed of about 25% is achieved with a limited silicon area and power overhead saving (about 10% and 12%, respectively) over the requirements of conventional adders. Usually, a good indication of the efficiency of an addition circuit may be obtained referring to the power-delay product. In Table 3 this parameter is given for all the compared adders.

TABLE 3

| 32-bit Adders 0.6 $\mu$m CMOS | Area [$(\mu m)^2$] | Delay [ns] | Max Power [mW] | PowerxDelay [pJ] |
|---|---|---|---|---|
| Ripple-Carry | 137700 | 15.8 | 15.8 | 250 |
| Carry-skip | 160173 | 9 | 17.1 | 154 |
| Newest Adder | 181944 | 5.8 | 21 | 122 |
| Carry-Select | 264966 | 5.9 | 26 | 153 |
| BCLA | 310168 | 5.5 | 36.4 | 200 |
| Spanning Tree Adder [2] | 419244 | 3.7 | 51 | 186 |
| New optimum Adder | 194766 | 4.5 | 28 | 126 |
| Optimum Conventional Cany-Skip | 176280 | 6 | 25 | 150 |

The new optimization method criterion has also been applied to optimize the block sizes of a 56-bit version of a carry strength based carry-skip adder. In this case, the optimization gave block sizes of 2-2-3-4-5-6-7-8-9-10, where blocks are listed from LSB to MSB. The optimized version of the new 56-bit adder has been laid-out using the AMS 0.35 um p-sub 3-metal 2-poly 3.3V CMOS technology and post layout simulations have been performed. In this case, an addition time of about 7 ns has been reached, with a silicon occupancy area of about 95000 $um^2$ and a power consumption of about 5 mW when a repetitive frequency of 40 MHz is assumed.

Operations related to adding operands in a first bit block (such as block B3 in FIG. 1) of an adder, which receives a block carry input from a second bit block of the adder (such as block B2 of FIG. 1) according to embodiments of the present invention will now be described further with reference to the flowchart illustration of FIG. 24. Operations begin at block 2400 by providing a least significant bit stage (such as bit stage 205 of FIG. 2) and a plurality of other bit stages (such as bit stages 207, 209, 211 and 213 of FIG. 2) in the first bit block. A bit associated propagation characteristic (bapc) $CS_1$ for the least significant bit stage 205 is generated based on bits of the operands $(X_0, Y_0)$ to be added which are input to the least significant bit stage with the bapc being independent of the block carry input $C_{in}$ to the first bit block (block 2405). A first bapc $CS_2$ is generated from the first of the other bit stages 207 based on bits of the operands $(X_1, Y_1)$ input to the first of the other bit stages and the bapc $CS_1$ generated by the least significant bit stage (block 2410).

The first bapc $CS_2$ from the first of the bit stages is independent of the block carry input.

A second bapc $CS_3$ is generated from the second of the other bit stages 209 based on the first bapc $CS_2$ and bits of the operands ($X_2$, $Y_2$) input to the second of the other bit stages (block 2415). The second bapc is also independent of the block carry input to the first bit block. The operands are added based on the first and second bapc and based on bits of the operands input to the first bit block (block 2420).

Operations related to adding of the operands as described at block 2420 above will now be described for particular embodiments of the present invention with reference to the flowchart illustration of FIG. 25. A sum output $S_2$ is generated from the second of the other bit stages based on the bits of the operands ($X_2$, $Y_2$) input to the second of the other bit stages, the first bapc $CS_2$ and the carry input $C_2$ to the second of the other bit stages (block 2500). A second carry output $C_3$ is generated from the second of the other bit stages that provides a carry input to a third of the other bit stages 211 (block 2510). The second carry output is selected as either the carry input to the second of the other bit stages or is calculated based on at least one of the bits of the operands input to the second bit stage based on the first. In other words, as described previously with reference to various embodiments of circuits according to the present invention, a carry strength characteristic may be utilized to determine whether an individual bit stage needs to calculate a carry to a next bit stage.

Note that, in particular embodiments of the present invention, the first and second bit blocks discussed above may be included in a carry-skip adder. In such embodiments, operations may include generating a last bapc $CS_8$ that is also independent of the carry input to the bit block. The last bapc further may be provided as a skip select signal output, which may not require additional gate processing.

Operations related to methods for selecting block sizes n for bit blocks of an N bit carry-skip adder according to embodiments of the present invention will now be further described with reference to the flowchart illustration of FIG. 26. Operations begin at block 2600 by determining a skip time (s) and a ripple time (r) for the carry-skip adder. A set of right triangles ($\Delta_\rho$) having a base defining an axis representing a block number of ones of the bit blocks is identified (block 2605). More particularly, block number 0 corresponds to a most significant one of the bit blocks and increasing bit block numbers correspond to increasingly significant ones of the bit blocks. The right triangles in the identified set further have a vertical left side paralleling a vertical axis representing a number of bits in the respective ones of the bit blocks and a right side have a slope of $-\sigma$. The orientation of the respective right triangles may be further understood, for example, by reference to the graphical illustration of FIG. 22 where the x axis corresponds to the base of the right triangles and the left vertical side corresponding to or paralleling the y axis of FIG. 22.

Sets of bits sizes (i.e., the "x" symbols shown in FIG. 22) are selected, for all except block number 0, that lie substantially on or within respective ones of the set of right triangles (block 2610). One of the sets of bit sizes corresponding to a smallest one of the set of right triangles is selected (block 2615). More particularly, the selected set is selected so that a cumulative total of bits represented by the selected set of bit sizes and an associated number of bits of block number 0, contains at least N bits.

Figure 24:
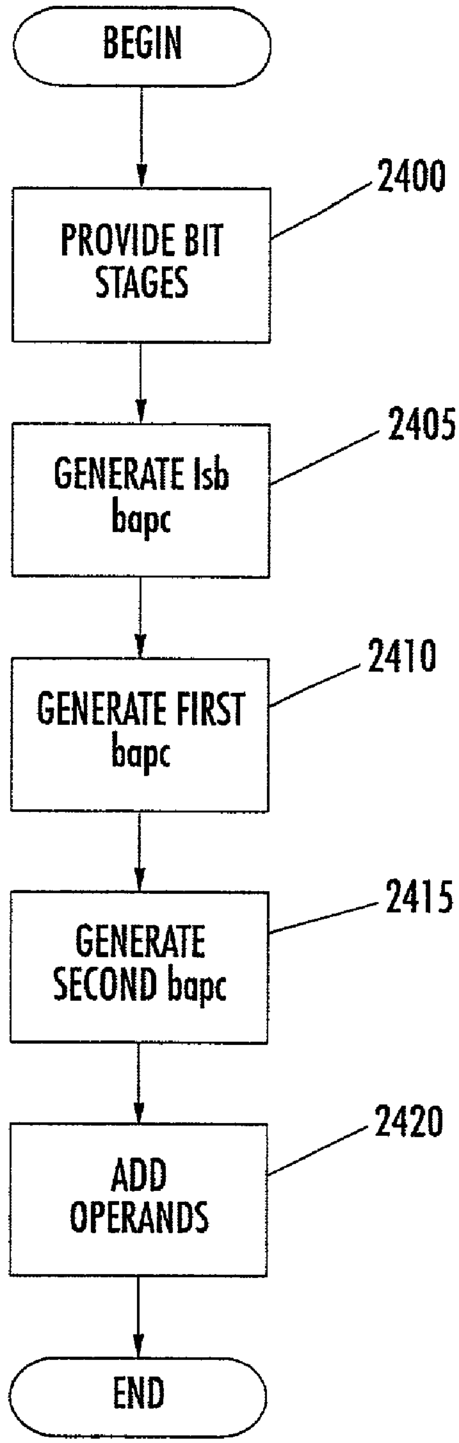
FIG. 24 is a flowchart illustrating operations for adding operands in an adder according to embodiments of the present invention.
Figure 25:
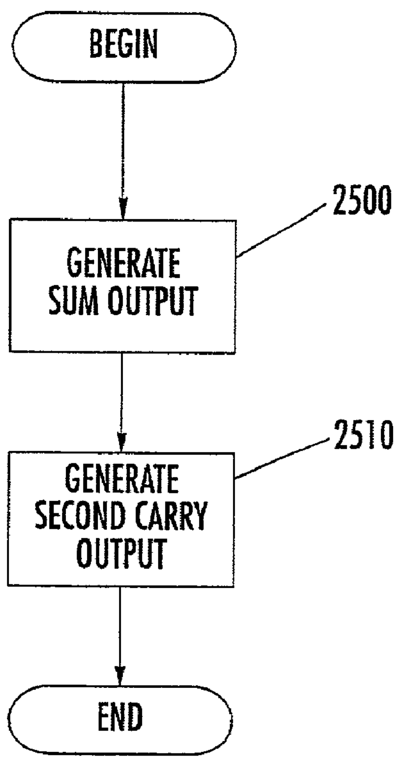
FIG. 25 is a flowchart illustrating operations related to adding operands according to embodiments of the present invention.
Figure 26:
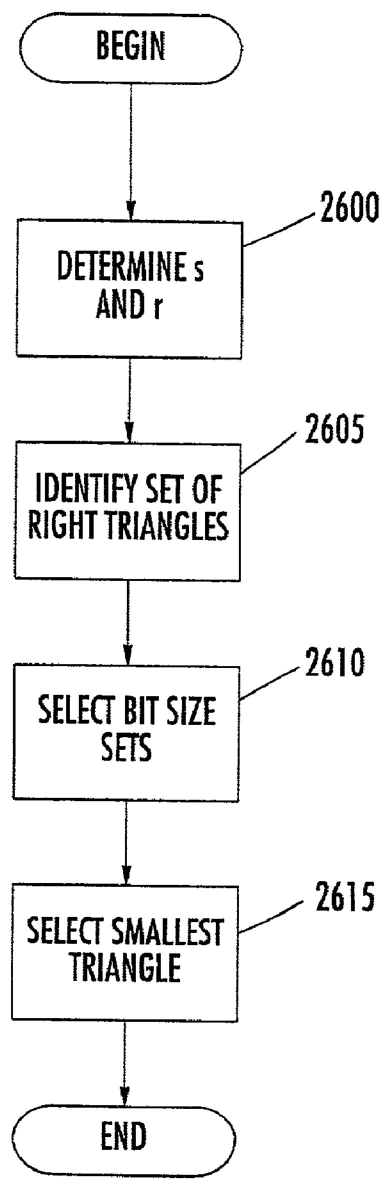
FIG. 26 is a flowchart illustrating operations for selecting block sizes for n bit blocks of an N bit carry-skip adder according to embodiments of the present invention.

It will be understood that blocks of the flowchart illustration of FIGS. 24–26 and of the block diagram and circuit diagram illustrations of FIGS. 1–21 and combinations of blocks in the flowchart illustration and block diagrams may be implemented using discrete and integrated electronic circuits. It will also be appreciated that blocks of the flowchart illustration of FIGS. 24–26 and of the block diagram illustration of FIGS. 1–21, and combinations of blocks in the flowchart illustration and block diagrams may be implemented using components other than those illustrated in FIGS. 1–26, and that, in general, various blocks of the flowchart illustration and block diagrams and combinations of blocks in the flowchart illustration and block diagrams, may be implemented in special purpose hardware such as discrete analog and/or digital circuitry, combinations of integrated circuits or one or more application specific integrated circuits (ASICs), as well as by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions specified in the flowchart block or blocks.

Accordingly, blocks of the flowchart illustration of FIGS. 24–26 support electronic circuits and other means for performing the specified functions, as well as combinations of operations for performing the specified functions. It will be understood that the circuits and other means supported by each block of the flowchart illustration of FIGS. 24–26, and combinations of blocks therein, can be implemented by special purpose hardware, software or firmware operating on special or general purpose data processors, or combinations thereof.

The present invention has been described above primarily with reference to carry-skip adders and various types of hybrid adders. However, the present invention is not so limited and may be applied to other types of adders, such as multiple-level adders. Furthermore, while the description above was primarily with reference to binary operands, the present invention may also be applied to circuits processing higher order radicals where a "bit stage" of a "bit block" is a non-binary operand circuit.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A bit block for an adder, the bit block comprising:

a first bit stage that generates a first bit associated propagation characteristic (bapc) that is independent of a carry input to the bit block from another bit block of the adder;

a second bit stage that, based on the first bapc, generates a second bapc that is independent of the carry input to the bit block.

2. The bit block of claim 1 wherein:

the first bit stage generates the first bapc based on first and second operand bits input to the first bit stage and a third bapc that is generated by a less significant bit stage of the bit block and is independent of the carry input to the bit block; and the second bit stage generates the second bapc based on first and second operands input to the second bit stage.

3. The bit block of claim 2 wherein the first and second bit stages each further generates a respective sum bit based on its input first and second operand bits and a respective first and second bit stage carry input.

4. The bit block of claim 3 wherein the second bit carry input to the second bit stage is generated by the first bit stage, the first bit stage selecting either the carry input to the bit block or a calculated carry output as the second bit carry input based on the third bapc.

5. The bit block of claim 4 further comprising:

a least significant bit stage that generates an initial bapc that is independent of the carry input to the bit block based on first and second operands input to the least significant bit stage.

6. The bit block of claim 5 wherein the least significant bit stage generates the initial bapc as the exclusive nor of the first and second operands input to the least significant bit stage.

7. The bit block of claim 6 wherein the least significant bit stage further generates a sum bit and a carry output based on the carry input to the bit block and the first and second operands input to the least significant bit stage.

8. The bit block of claim 7 wherein the adder is a carry-skip adder and wherein the bit block comprises one of a plurality of bit blocks of the carry-skip adder.

9. The bit block of claim 7 wherein the bit block further comprises a most significant bit stage configured to generate a last bapc that is independent of the carry input to the bit block, the last bapc being provided as a skip select signal output from the bit block in the carry-skip adder.

10. The bit block of claim 7 wherein the adder is a hybrid carry-look-ahead adder and wherein the bit block is included in an adder stage of the adder coupled to a carry tree of the adder.

11. The bit block of claim 10 wherein the carry tree of the adder comprises a Lynch-Swartzlander type carry tree and wherein the adder stage is substituted for the carry select circuit of a Lynch-Swartzlander type hybrid carry-look-ahead adder.

12. The bit block of claim 10 wherein the carry tree of the adder comprises a Kantabutra type carry tree and wherein the adder stage is substituted for the carry select circuit of a Kantabutra type hybrid carry-look-ahead adder.

13. The bit block of claim 12 wherein the adder stage comprises a 16-bit adder and the bit block comprises either a four bit block or a six bit block.

14. The bit block of claim 12 wherein the adder stage comprises a 15-bit adder and the bit block comprises either a four bit block or a five bit block.

15. The bit block of claim 14 wherein the bit block further comprises an external propagation characteristic input that indicates whether a carry output for a bit stage of the bit block is to be generated from within the adder including the bit block or is dependent on a carry input to the adder.

16. The bit block of claim 10 wherein the adder stage has a worst case delay no greater than a worst case delay of the carry tree of the adder.

17. The bit block of claim 10 wherein the adder comprises a 56-bit operand adder.

18. The bit block of claim 4 wherein the first bit stage is further configured to calculate the calculated carry output responsive to input of the first and second operand bits to the first bit stage without waiting for input of the carry input to the bit block.

19. The bit block of claim 4 wherein the bit block comprises an eight bit block including 8 bit stages.

20. The bit block of claim 19 wherein the adder comprises a 32-bit adder.

21. The bit block of claim 4 wherein the adder comprises a 32-bit adder.

22. The bit block of claim 4 wherein the first and second bit stage each further comprise a three input multiplexer.

23. The bit block of claim 22 wherein the three input multiplexer of a respective bit stage includes a first input coupled to one of the first and second operands of the respective bit stage, a second input coupled to the carry input to the bit block, a third input coupled to a calculated carry output of a preceding bit stage of the bit block, a first select input coupled to an exclusive nor of the first and second operands of the respective bit stage and a second select input coupled to the bapc generated by the respective bit stage.

24. The bit block of claim 23 wherein the three input multiplexer provides the output logic $OUT=S0A+\overline{S0S1}\,B+\overline{S0}S1\,C+S0\,\overline{S1}\,B$ wherein A, B and C are the inputs and S0 and S1 are select inputs.

25. An adder comprising:

a first bit block; and a second bit block comprises a first bit stage that generates a first bit associated propagation characteristic (bapc) that is independent of the block carry input from the first bit block; and wherein the second bit block further comprises a second bit stage that, based on the first bapc, generates a second bapc that is independent of the block carry input from the first block.

26. The adder of claim 25 wherein:

the first bit stage generates the first bapc based on first and second operand bits input to the first bit stage and a third bapc that is generated by a less significant bit stage of the bit block and is independent of the block carry input from the first bit block; and the second bit stage generates the second bapc based on first and second operands input to the second bit stage.

27. The adder of claim 26 wherein the first and second bit stages each further generate a sum bit based on their input first and second operand bits and a respective first and second bit stage carry input.

28. The adder of claim 27 wherein the second bit carry input to the second bit stage is generated by the first bit stage, the first bit stage selecting either the block carry input from the first bit block or a calculated carry output as the second bit carry input based on the third bapc.

29. The adder of claim 28, the second bit block further comprising:

a least significant bit stage that generates an initial bapc that is independent of the block carry input from the first bit block based on first and second operands input to the least significant bit stage.

30. The adder of claim 29 wherein the least significant bit stage generates the initial bapc as the exclusive nor of the first and second operands input to the least significant bit stage.

31. The adder of claim 29 wherein the adder is a carry-skip adder.

32. The adder of claim 31 wherein the second bit block further comprises a most significant bit stage configured to generate a last bapc that is independent of the block carry input from the first bit block, the last bapc being provided as a skip select signal output from the second bit block in the carry-skip adder.

33. The adder of claim 29 wherein the adder is included in a hybrid carry-look-ahead adder and wherein the adder is coupled to a carry tree of the hybrid carry-look-ahead adder.

34. The adder of claim 33 wherein the carry tree of the hybrid carry-look-ahead adder comprises a Lynch-Swartzlander type carry tree and wherein the adder is substituted for the carry select circuit of a Lynch-Swartzlander type hybrid carry-look-ahead adder.

35. The adder of claim 33 wherein the carry tree of the hybrid carry-look-ahead adder comprises a Kantabutra type carry tree and wherein the adder is substituted for the carry select circuit of a Kantabutra type hybrid carry-look-ahead adder.

36. The bit block of claim 35 wherein the adder stage comprises a 16-bit adder and the bit block comprises at least one of a four bit block and a six bit block.

37. The bit block of claim 35 wherein the adder stage comprises a 15-bit adder and the bit block comprises either a four bit block or a five bit block.

38. The adder of claim 33 wherein the adder has a worst case delay no greater than a worst case delay of the carry tree of the hybrid carry-look-ahead adder.

39. The bit block of claim 33 wherein the adder comprises a 56-bit operand adder.

40. The adder of claim 28 wherein the first bit stage is further configured to calculate the calculated carry output responsive to input of the first and second operand bits to the first bit stage without waiting for input of the block carry input from the first bit block.

41. The adder of claim 28 wherein the second bit block comprises an eight bit block including 8 bit stages.

42. The adder of claim 41 wherein the adder comprises a 32-bit adder.

43. A method for adding operands in a first bit block of an adder which receives a block carry input from a second bit block of the adder, the method comprising:

providing a least significant bit stage and a plurality of other bit stages in the first bit block;

generating a first bit associated propagation characteristic (bapc) from a first of the other bit stages based on bits of the operands input to the first of the other bit stages and a bapc generated by the least significant bit stage, the first bapc being independent of the block carry input;

generating a second bapc from a second of the other bit stages based on the first bapc and bits of the operands input to the second of the other bit stages, the second bapc being independent of the block carry input; and adding the operands based on the first and second bapc and bits of the operands input to the first bit block.

44. The method of claim 43 further comprising generating a first carry output from the first of the other bit stages that provides a carry input to the second of the other bit stages and wherein the step of adding the operands includes:

generating a sum output from the second of the bit stages based on the bits of the operands input to the second of the other bit stages, the first bapc and the carry input to the second of the other bit stages; and generating a second carry output from the second of the other bit stages that provides a carry input to a third of the other bit stages, the second carry output being selected as either the carry input to the second of the other bit stages or calculated based on at least one of the bits of the operands input to the second bit stage based on the first bapc.

45. The method of claim 44 wherein the step of generating a second carry output further comprises calculating the second carry output responsive to input of the bits of the operands input to the second of the other bit stages without waiting for input of the carry input to the second of the other bit stages.

46. The method of claim 45 further comprising generating the bapc generated by the least significant bit stage based on bits of the operands input to the least significant bit stage independent of the block carry input.

47. The method of claim 46 wherein the first and second bit block are included in a carry-skip adder, the method further comprising generating a last bapc that is independent of the carry input to the bit block from a most significant bit stage of the other bit stages, the last bapc being provided as a skip select signal output from the first bit block in the carry-skip adder.

48. The method of claim 45 wherein the step of generating the bapc generated by the least significant bit stage as an exclusive nor of the bits of the operands input to the least significant bit stage.

* * * * *